United States Patent
Chen et al.

(10) Patent No.: US 10,177,824 B2
(45) Date of Patent: Jan. 8, 2019

(54) SIGNAL PROCESSING METHOD AND RELATED DEVICE

(71) Applicant: Huawei Technologies Co., Ltd., Shenzhen, Guangdong (CN)

(72) Inventors: Zihuan Chen, Chengdu (CN); Kun Li, Chengdu (CN); Hao Long, Madrid (ES)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/668,602

(22) Filed: Aug. 3, 2017

(65) Prior Publication Data

US 2017/0338865 A1    Nov. 23, 2017

Related U.S. Application Data

(63) Continuation of application No. PCT/CN2015/072252, filed on Feb. 4, 2015.

(51) Int. Cl.
*H04L 27/06* (2006.01)
*H04B 7/0408* (2017.01)
(Continued)

(52) U.S. Cl.
CPC ......... *H04B 7/0408* (2013.01); *H04B 1/1081* (2013.01); *H04B 7/0885* (2013.01);
(Continued)

(58) Field of Classification Search
CPC ..... H04L 7/042; H04L 27/2662; H04B 7/067; H04B 7/0408; H04B 7/0669; H04W 56/605
(Continued)

(56) References Cited

U.S. PATENT DOCUMENTS

| 2002/0135514 A1 | 9/2002 | Yoshida |
| 2003/0067970 A1 | 4/2003 | Kim |

(Continued)

FOREIGN PATENT DOCUMENTS

| CN | 1369932 A | 9/2002 |
| CN | 1413039 A | 4/2003 |
| WO | 0118975 A2 | 3/2001 |

OTHER PUBLICATIONS

Quan Wan, et al, "MRC-Rake-LMS-Equalizer Performance for INVB," Communication Systems, 2006, ICCS 2006, 10TH IEEE Singapore International Conference, IEEE, PI, Oct. 1, 2006, XP031042196, 6 pages.

*Primary Examiner* — Khai Tran

(57) ABSTRACT

A signal processing method and a related device are provided. The signal processing method includes: determining that there are N directions for received signals corresponding to a same signal source; configuring beam directions of an antenna as the N directions; estimating delays of the N received signals received by using the antenna, and separately performing, by using the estimated delays of the N received signals, delay compensation on the N received signals to obtain N received signals obtained after delay compensation, where the N received signals are in a one-to-one correspondence with the N directions, and N is an integer greater than 1; and performing combining processing on the N received signals obtained after delay compensation. The technical solutions in embodiments of the present invention help increase a signal reception gain in a multipath scenario.

18 Claims, 10 Drawing Sheets

(51) Int. Cl.
   *H04B 7/26*      (2006.01)
   *H04B 1/10*      (2006.01)
   *H04B 7/08*      (2006.01)
   *H04W 56/00*     (2009.01)

(52) U.S. Cl.
   CPC ............ *H04B 7/0897* (2013.01); *H04B 7/26* (2013.01); *H04W 56/005* (2013.01); *H04B 7/086* (2013.01)

(58) Field of Classification Search
   USPC ....... 375/343, 347; 455/39, 63.44, 334, 562; 342/367, 417, 377
   See application file for complete search history.

(56) References Cited

U.S. PATENT DOCUMENTS

| | | | |
|---|---|---|---|
| 2004/0235421 A1* | 11/2004 | Matsuoka | H04B 7/0617 455/63.4 |
| 2005/0206564 A1* | 9/2005 | Mao | H01Q 3/2605 342/377 |
| 2006/0279462 A1 | 12/2006 | Adler et al. | |
| 2012/0134435 A1 | 5/2012 | Kapoor et al. | |
| 2014/0139372 A1 | 5/2014 | Seol et al. | |

\* cited by examiner

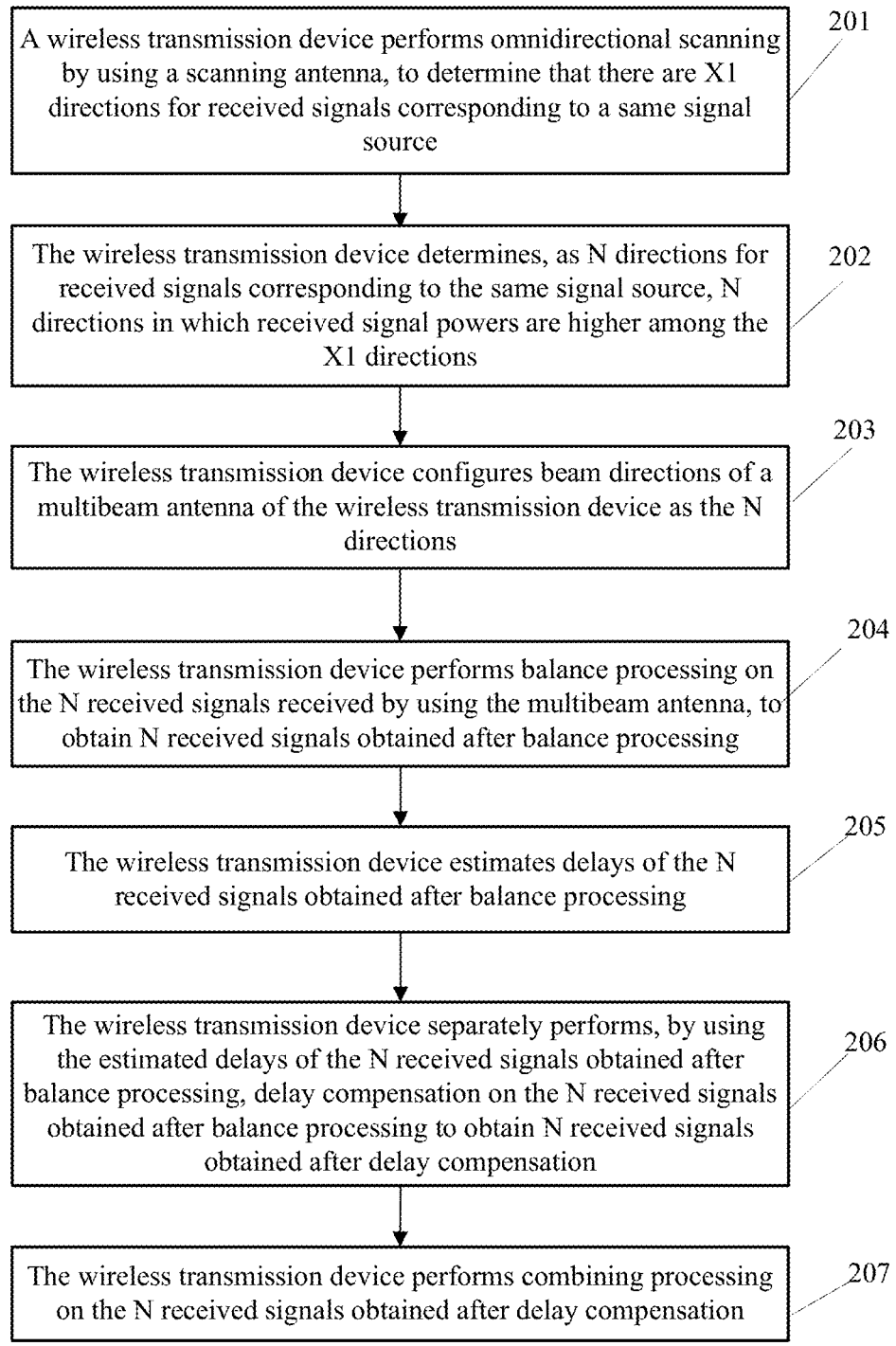
FIG. 2-a

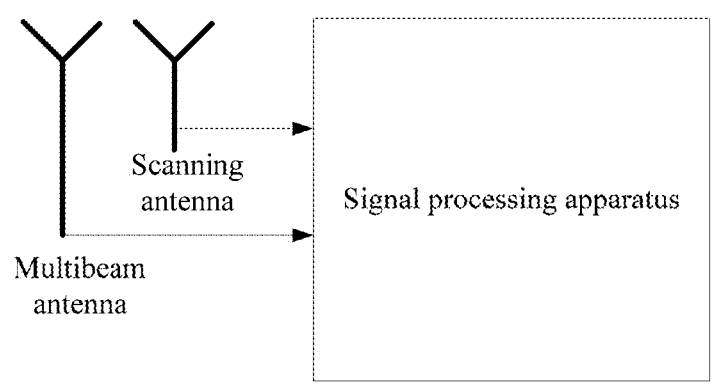
FIG. 2-b
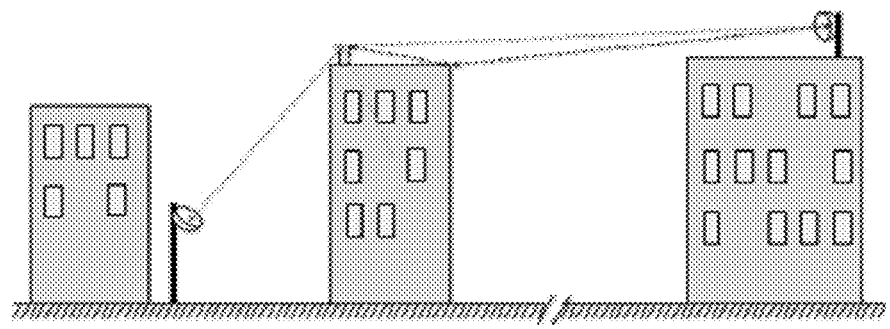
FIG. 2-c

Signal sequence, entering a sliding window at a time point t, of the i$^{th}$ received signal obtained after balance processing ...000111000111100001 1110000011 00...... 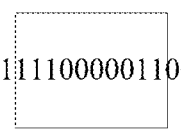

Signal sequence, entering a sliding window at a time point t+1, of the i$^{th}$ received signal obtained after balance processing ...0001110001111000011111000001 100...... 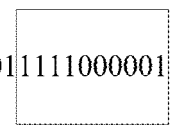

Signal sequence, entering a sliding window at a time point t+2, of the i$^{th}$ received signal obtained after balance processing ...00011100011110000 11111000001 100...... 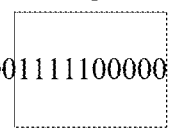

FIG. 2-d

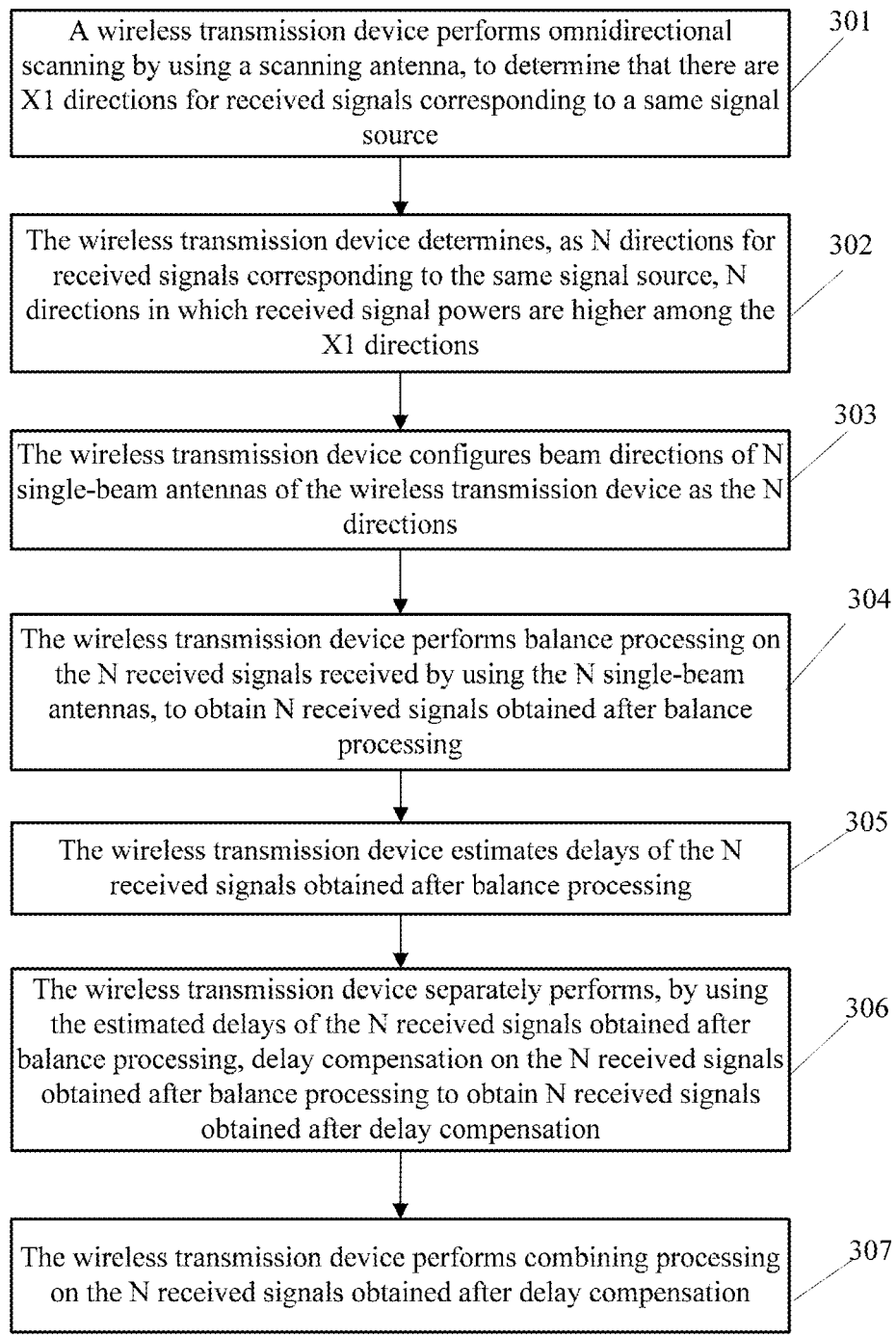
FIG. 3-a

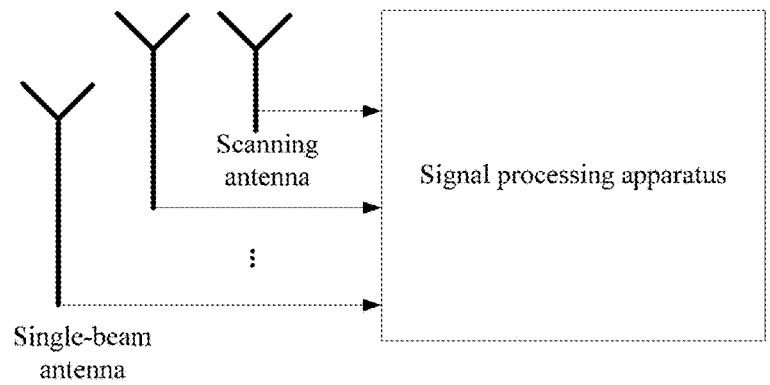
FIG. 3-b
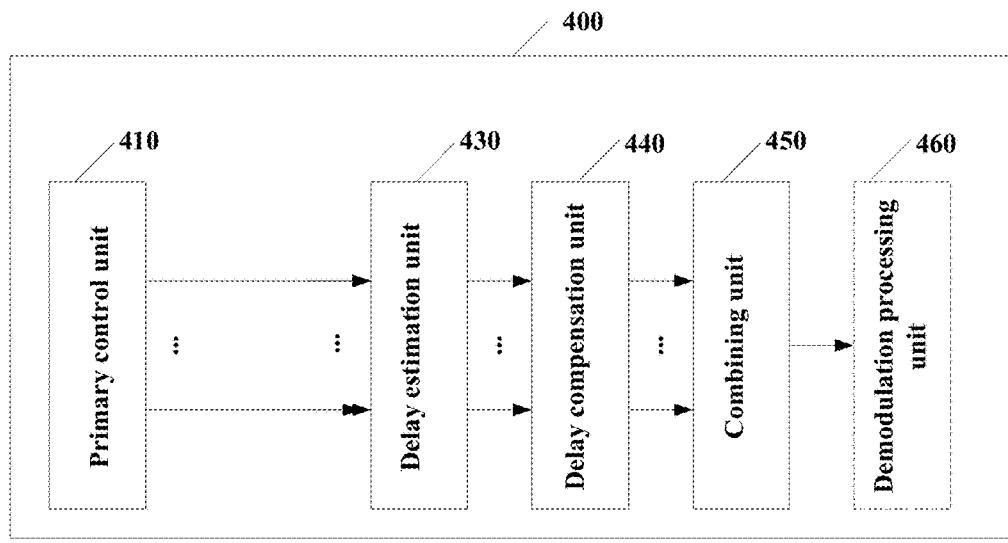
FIG. 4-a

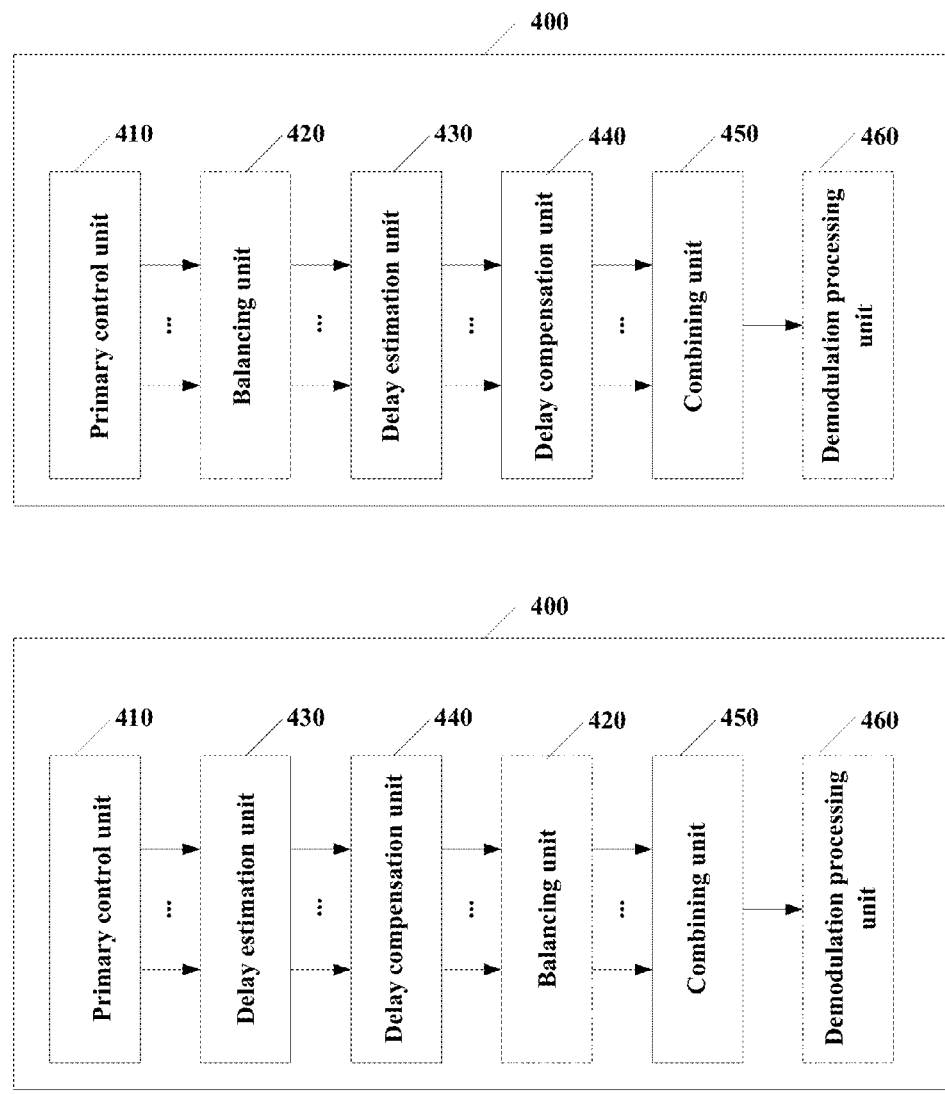
FIG. 4-b
FIG. 4-c

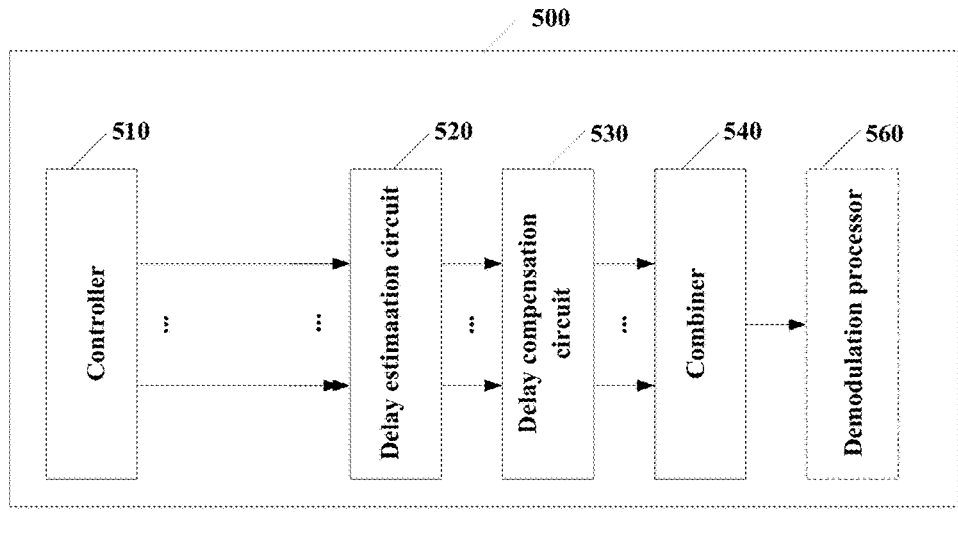
FIG. 5-a
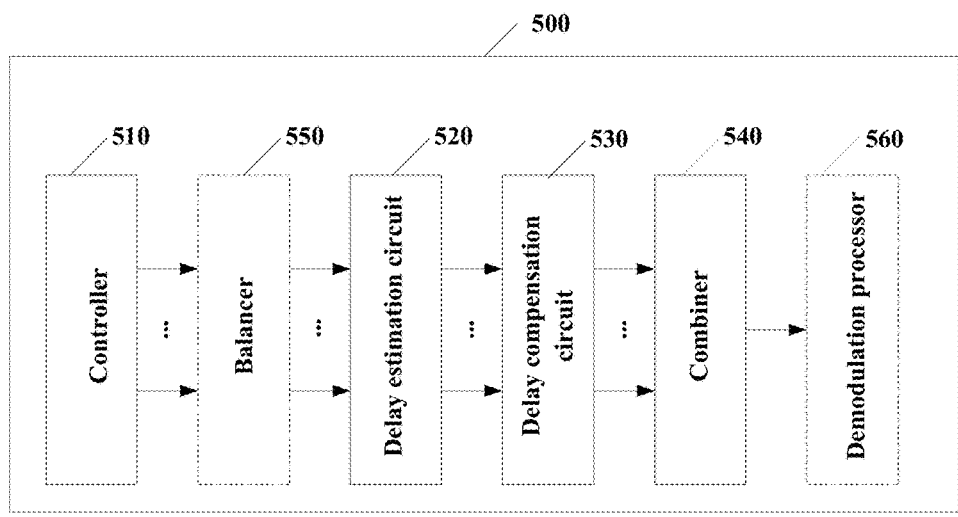
FIG. 5-b

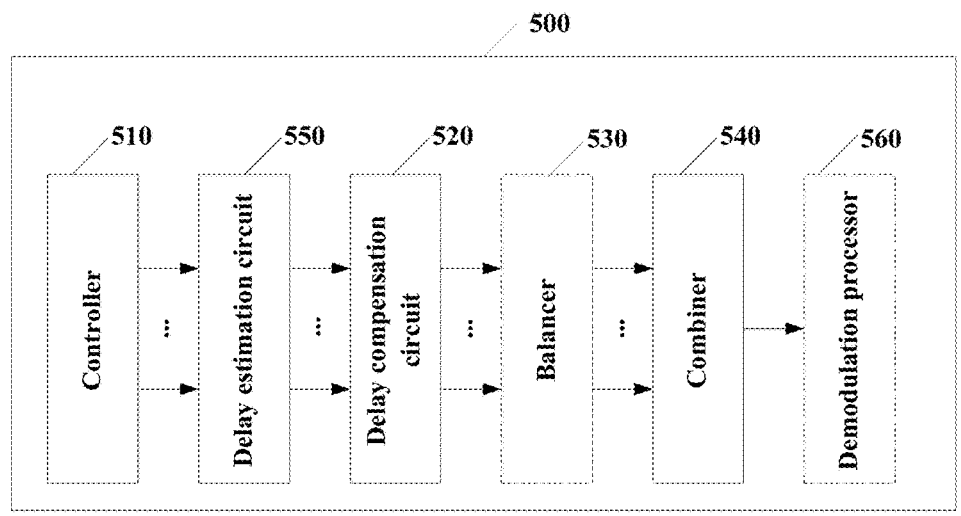
FIG. 5-c
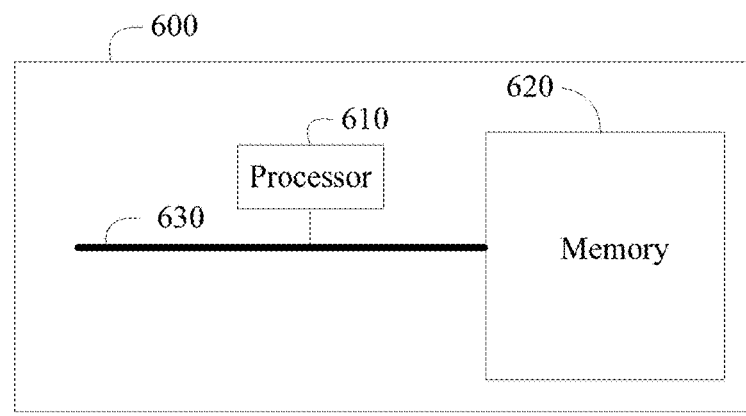
FIG. 6

SIGNAL PROCESSING METHOD AND RELATED DEVICE

CROSS-REFERENCE TO RELATED APPLICATIONS

This application is a continuation of International Application No. PCT/CN2015/072252, filed on Feb. 4, 2015, the disclosure of which is hereby incorporated by reference in its entirety.

TECHNICAL FIELD

The present invention relates to the field of communications technologies, and specifically, to a signal processing method and a related device.

BACKGROUND

Related technologies of a communications network are being evolved constantly with ever-increasing service requests. Technologies such as a Long Term Evolution (LTE) technology, a 4G technology, and a 5G technology are used gradually.

In a communications system based on the LTE technology, the 4G technology, and the 5G technology, small cells are densely deployed. Wireless backhaul is to be in an accelerated growth trend in the future, and a millimeter-wave backhaul manner may become dominant in the future. Usually, small cells are densely deployed in densely populated areas, and communication environments such as street environments are usually complex in the densely populated areas. Therefore, different from a conventional millimeter-wave communication environment, a small-cell backhaul communication scenario becomes complex and encounters more non-line-of-sight communication environments. In addition, the non-line-of-sight communication environment brings challenges to millimeter-wave small-cell backhaul. The challenges mainly include increased channel attenuation and very complex multiple paths of channels. In a traditional solution, great attenuation is generally overcome by increasing an antenna gain and by using a space diversity technology.

In a research and practice process, the inventor of the present invention finds that in a traditional solution, for a multipath scenario, all multipath signals are generally directly considered as interference and eliminated. This leads to a relatively small signal reception gain in the multipath scenario.

SUMMARY

Embodiments of the present invention provide a signal processing method and a related device, so as to increase a signal reception gain in a multipath scenario.

A first aspect of the embodiments of the present invention provides a signal processing method, including:

determining that there are N directions for received signals corresponding to a same signal source;

configuring beam directions of an antenna as the N directions;

estimating delays of the N received signals received by using the antenna, and separately performing, by using the estimated delays of the N received signals, delay compensation on the N received signals to obtain N received signals obtained after delay compensation, where the N received signals are in a one-to-one correspondence with the N directions, and N is an integer greater than 1; and performing combining processing on the N received signals obtained after delay compensation.

With reference to the first aspect, in a first possible implementation of the first aspect, the determining that there are N directions for received signals corresponding to a same signal source includes: performing omnidirectional scanning by using the antenna, to determine that there are X1 directions for received signals corresponding to the same signal source; and determining, as the N directions for the received signals corresponding to the same signal source, N directions in which received signal powers are higher among the X1 directions, where X1 is an integer, and X1 is greater than or equal to N.

With reference to the first aspect or the first possible implementation of the first aspect, in a second possible implementation of the first aspect, the configuring beam directions of an antenna as the N directions includes:

configuring beam directions of a multibeam antenna as the N directions; or configuring beam directions of N single-beam antennas as the N directions, where the N single-beam antennas are in a one-to-one correspondence with the N directions.

With reference to the first aspect, the first possible implementation of the first aspect, or the second possible implementation of the first aspect, in a third possible implementation of the first aspect, before the estimating delays of the N received signals received by using the antenna, the method further includes: performing balance processing on the N received signals received by using the antenna, to obtain N received signals obtained after balance processing; and the estimating delays of the N received signals received by using the antenna, and separately performing, by using the estimated delays of the N received signals, delay compensation on the N received signals to obtain N received signals obtained after delay compensation includes:

estimating delays of the N received signals obtained after balance processing, and separately performing, by using the estimated delays of the N received signals obtained after balance processing, delay compensation on the N received signals obtained after balance processing to obtain the N received signals obtained after delay compensation.

With reference to the third possible implementation of the first aspect, in a fourth possible implementation of the first aspect, the performing combining processing on the N received signals obtained after delay compensation includes:

calculating a combining weight for the N received signals obtained after delay compensation; performing, by using the calculated combining weight for the N received signals obtained after delay compensation, weighted processing on the N received signals obtained after delay compensation, to obtain N received signals obtained after delay compensation and weighted processing; and combining the N received signals obtained after delay compensation and weighted processing.

With reference to the fourth possible implementation of the first aspect, in a fifth possible implementation of the first aspect, the calculating a combining weight for the N received signals obtained after delay compensation includes: calculating, based on a minimum mean square error criterion, the combining weight for the N received signals obtained after delay compensation; or calculating, based on a least square criterion, the combining weight for the N received signals obtained after delay compensation; or calculating, based on a maximum signal to noise ratio criterion, the combining weight for the N received signals obtained after delay compensation.

With reference to the third possible implementation of the first aspect, the fourth possible implementation of the first aspect, or the fifth possible implementation of the first aspect, in a sixth possible implementation of the first aspect, the estimating delays of the N received signals obtained after balance processing includes:

calculating cross correlation values between a training sequence and signal sequences, entering a sliding window, of the N received signals obtained after balance processing, where a length of the sliding window is the same as a length of the training sequence;

calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

With reference to the third possible implementation of the first aspect, the fourth possible implementation of the first aspect, or the fifth possible implementation of the first aspect, in a seventh possible implementation of the first aspect, the estimating delays of the N received signals obtained after balance processing includes:

calculating cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence;

calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

With reference to the first aspect, the first possible implementation of the first aspect, or the second possible implementation of the first aspect, in an eighth possible implementation of the first aspect, before the performing combining processing on the N received signals obtained after delay compensation, the method further includes: performing balance processing on the N received signals obtained after delay compensation, to obtain N received signals obtained after balance processing; and the performing combining processing on the N received signals obtained after delay compensation includes: performing combining processing on the N received signals obtained after balance processing.

With reference to the eighth possible implementation of the first aspect, in a ninth possible implementation of the first aspect, the performing combining processing on the N received signals obtained after balance processing includes:

calculating a combining weight for the N received signals obtained after balance processing; performing, by using the calculated combining weight for the N received signals obtained after balance processing, weighted processing on the N received signals obtained after balance processing, to obtain N received signals obtained after balance processing and weighted processing; and combining the N received signals obtained after balance processing and weighted processing.

With reference to the ninth possible implementation of the first aspect, in a tenth possible implementation of the first aspect, the calculating a combining weight for the N received signals obtained after balance processing includes: calculating, based on a minimum mean square error criterion, the combining weight for the N received signals obtained after balance processing; or calculating, based on a least square criterion, the combining weight for the N received signals obtained after balance processing; or calculating, based on a maximum signal to noise ratio criterion, the combining weight for the N received signals obtained after balance processing.

With reference to the eighth possible implementation of the first aspect, the ninth possible implementation of the first aspect, or the tenth possible implementation of the first aspect, in an eleventh possible implementation of the first aspect, the estimating delays of the N received signals includes:

calculating cross correlation values between a training sequence and signal sequences, entering a sliding window, of the N received signals, where a length of the sliding window is the same as a length of the training sequence; and calculating delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculating the delays of the N received signals based on the calculated delay time points of the N received signals.

With reference to the eighth possible implementation of the first aspect, the ninth possible implementation of the first aspect, or the tenth possible implementation of the first aspect, in a twelfth possible implementation of the first aspect, the estimating delays of the N received signals includes:

calculating cross correlation values between a reference sequence and signal sequences, entering a sliding window, of the N received signals, where the reference sequence is an L-bit-long signal sequence of the $i^{th}$ received signal of the N received signals, and a width of the sliding window is the same as a width of the reference sequence; and calculating delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculating the delays of the N received signals based on the calculated delay time points of the N received signals.

With reference to any one of the first aspect, or the first to the twelfth possible implementations of the first aspect, in a thirteenth possible implementation of the first aspect, after the performing combining processing on the N received signals obtained after delay compensation, the method further includes: performing omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, changing a beam direction configuration of the antenna to ensure that beam directions of the antenna that are obtained after the configuration is changed include the direction Xi, where the direction Xi is different from any direction of the N directions, and the direction Xj is any direction of the N directions.

A second aspect of the embodiments of the present invention provides a signal processing apparatus, including:

a controller, configured to: determine that there are N directions for received signals corresponding to a same signal source; and configure beam directions of an antenna as the N directions;

a delay estimation circuit, configured to estimate delays of the N received signals received by using the antenna, where the N received signals are in a one-to-one correspondence with the N directions, and N is an integer greater than 1;

a delay compensation circuit, configured to separately perform, by using the estimated delays of the N received signals, delay compensation on the N received signals obtained after balance processing to obtain N received signals obtained after delay compensation; and a combiner, configured to perform combining processing on the N received signals obtained after delay compensation.

With reference to the second aspect, in a first possible implementation of the second aspect, the controller is specifically configured to: perform omnidirectional scanning by using the antenna, to determine that there are X1 directions for received signals corresponding to the same signal source; determine, as the N directions for the received signals corresponding to the same signal source, N directions in which received signal powers are higher among the X1 directions; and configure the beam directions of the antenna as the N directions, where X1 is an integer, and X1 is greater than or equal to N.

With reference to the second aspect or the first possible implementation of the second aspect, in a second possible implementation of the second aspect, in the aspect of configuring beam directions of an antenna as the N directions, the controller is specifically configured to:

configure beam directions of a multibeam antenna as the N directions; or configure beam directions of N single-beam antennas as the N directions, where the N single-beam antennas are in a one-to-one correspondence with the N directions.

With reference to the second aspect, the first possible implementation of the second aspect, or the second possible implementation of the second aspect, in a third possible implementation of the second aspect, the signal processing apparatus further includes a balancer, configured to: before the delays of the N received signals received by using the antenna is estimated, perform balance processing on the N received signals received by using the antenna, to obtain N received signals obtained after balance processing, where the delay estimation circuit is specifically configured to estimate delays of the N received signals obtained after balance processing; and the delay compensation circuit is specifically configured to separately perform, by using the estimated delays of the N received signals obtained after balance processing, delay compensation on the N received signals obtained after balance processing to obtain the N received signals obtained after delay compensation.

With reference to the third possible implementation of the second aspect, in a fourth possible implementation of the second aspect, the combiner is specifically configured to: calculate a combining weight for the N received signals obtained after delay compensation; perform, by using the calculated combining weight for the N received signals obtained after delay compensation, weighted processing on the N received signals obtained after delay compensation, to obtain N received signals obtained after delay compensation and weighted processing; and combine the N received signals obtained after delay compensation and weighted processing.

With reference to the fourth possible implementation of the second aspect, in a fifth possible implementation of the second aspect, in the aspect of calculating a combining weight for the N received signals obtained after delay compensation, the combiner is specifically configured to: calculate, based on a minimum mean square error criterion, the combining weight for the N received signals obtained after delay compensation; or calculate, based on a least square criterion, the combining weight for the N received signals obtained after delay compensation; or calculate, based on a maximum signal to noise ratio criterion, the combining weight for the N received signals obtained after delay compensation.

With reference to the third possible implementation of the second aspect, the fourth possible implementation of the second aspect, or the fifth possible implementation of the second aspect, in a sixth possible implementation of the second aspect, the delay estimation circuit is specifically configured to: calculate cross correlation values between a training sequence and signal sequences, entering a sliding window, of the N received signals obtained after balance processing, where a length of the sliding window is the same as a length of the training sequence; calculate delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculate, based on the calculated delay time points of the N received signals obtained after balance processing, the delays of the N received signals obtained after balance processing.

With reference to the third possible implementation of the second aspect, the fourth possible implementation of the second aspect, or the fifth possible implementation of the second aspect, in a seventh possible implementation of the second aspect, the delay estimation circuit is specifically configured to: calculate cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence; calculate delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculate, based on the calculated delay time points of the N received signals obtained after balance processing, the delays of the N received signals obtained after balance processing.

With reference to the second aspect, the first possible implementation of the second aspect, or the second possible implementation of the second aspect, in an eighth possible implementation of the second aspect, the signal processing apparatus further includes a balancer, configured to: before combining processing is performed on the N received signals obtained after delay compensation, perform balance processing on the N received signals obtained after delay compensation, to obtain N received signals obtained after balance processing, where the combiner is specifically configured to perform combining processing on the N received signals obtained after balance processing.

With reference to the eighth possible implementation of the second aspect, in a ninth possible implementation of the second aspect, the combiner is specifically configured to: calculate a combining weight for the N received signals obtained after balance processing; perform, by using the calculated combining weight for the N received signals obtained after balance processing, weighted processing on the N received signals obtained after balance processing, to obtain N received signals obtained after balance processing and weighted processing; and combine the N received signals obtained after balance processing and weighted processing.

With reference to the ninth possible implementation of the second aspect, in a tenth possible implementation of the second aspect, in the aspect of calculating a combining weight for the N received signals obtained after balance processing, the combiner is specifically configured to: calculate, based on a minimum mean square error criterion, the combining weight for the N received signals obtained after balance processing; or calculate, based on a least square criterion, the combining weight for the N received signals obtained after balance processing; or calculate, based on a maximum signal to noise ratio criterion, the combining weight for the N received signals obtained after balance processing.

With reference to the eighth possible implementation of the second aspect, the ninth possible implementation of the second aspect, or the tenth possible implementation of the second aspect, in an eleventh possible implementation of the second aspect, the delay estimation circuit is specifically configured to: calculate cross correlation values between a training sequence and signal sequences, entering a sliding window, of the N received signals, where a length of the sliding window is the same as a length of the training sequence; calculate delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculate the delays of the N received signals based on the calculated delay time points of the N received signals.

With reference to the eighth possible implementation of the second aspect, the ninth possible implementation of the second aspect, or the tenth possible implementation of the second aspect, in a twelfth possible implementation of the second aspect, the delay estimation circuit is specifically configured to: calculate cross correlation values between a reference sequence and signal sequences, entering a sliding window, of the N received signals, where the reference sequence is an L-bit-long signal sequence of the $i^{th}$ received signal of the N received signals, and a width of the sliding window is the same as a width of the reference sequence; calculate delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculate the delays of the N received signals based on the calculated delay time points of the N received signals.

With reference to any one of the second aspect, or the first to the twelfth possible implementations of the second aspect, in a thirteenth possible implementation of the second aspect, the controller is further configured to: after combining processing is performed on the N received signals obtained after delay compensation, perform omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, change a beam direction configuration of the antenna to ensure that beam directions of the antenna that are obtained after the configuration is changed include the direction Xi, where the direction Xi is different from any direction of the N directions, and the direction Xj is any direction of the N directions.

A third aspect of the embodiments of the present invention provides a signal processing apparatus, including:

a processor and a memory, where the processor invokes code or instructions in the memory to perform the following steps:

determining that there are N directions for received signals corresponding to a same signal source;

configuring beam directions of an antenna as the N directions;

estimating delays of the N received signals received by using the antenna, and separately performing, by using the estimated delays of the N received signals, delay compensation on the N received signals to obtain N received signals obtained after delay compensation, where the N received signals are in a one-to-one correspondence with the N directions, and N is an integer greater than 1; and performing combining processing on the N received signals obtained after delay compensation.

With reference to the third aspect, in a first possible implementation of the third aspect, the determining that there are N directions for received signals corresponding to a same signal source includes: performing omnidirectional scanning by using the antenna, to determine that there are X1 directions for received signals corresponding to the same signal source; and determining, as the N directions for the received signals corresponding to the same signal source, N directions in which received signal powers are higher among the X1 directions, where X1 is an integer, and X1 is greater than or equal to N.

With reference to the third aspect or the first possible implementation of the third aspect, in a second possible implementation of the third aspect, the configuring beam directions of an antenna as the N directions includes:

configuring beam directions of a multibeam antenna as the N directions; or configuring beam directions of N single-beam antennas as the N directions, where the N single-beam antennas are in a one-to-one correspondence with the N directions.

With reference to the third aspect, the first possible implementation of the third aspect, or the second possible implementation of the third aspect, in a third possible implementation of the third aspect, before the estimating delays of the N received signals received by using the antenna, the processor performs balance processing on the N received signals received by using the antenna, to obtain N received signals obtained after balance processing; and the estimating delays of the N received signals received by using the antenna, and separately performing, by using the estimated delays of the N received signals, delay compensation on the N received signals to obtain N received signals obtained after delay compensation includes:

estimating delays of the N received signals obtained after balance processing, and separately performing, by using the estimated delays of the N received signals obtained after balance processing, delay compensation on the N received signals obtained after balance processing to obtain the N received signals obtained after delay compensation.

With reference to the third possible implementation of the third aspect, in a fourth possible implementation of the third aspect, the performing combining processing on the N received signals obtained after delay compensation includes:

calculating a combining weight for the N received signals obtained after delay compensation; performing, by using the calculated combining weight for the N received signals obtained after delay compensation, weighted processing on the N received signals obtained after delay compensation, to obtain N received signals obtained after delay compensation and weighted processing; and combining the N received signals obtained after delay compensation and weighted processing.

With reference to the fourth possible implementation of the third aspect, in a fifth possible implementation of the third aspect, the calculating a combining weight for the N received signals obtained after delay compensation includes: calculating, based on a minimum mean square error criterion, the combining weight for the N received signals obtained after delay compensation; or calculating, based on a least square criterion, the combining weight for the N received signals obtained after delay compensation; or calculating, based on a maximum signal to noise ratio criterion, the combining weight for the N received signals obtained after delay compensation.

With reference to the third possible implementation of the third aspect, the fourth possible implementation of the third aspect, or the fifth possible implementation of the third aspect, in a sixth possible implementation of the third aspect, the estimating delays of the N received signals obtained after balance processing includes:

calculating cross correlation values between a training sequence and signal sequences, entering a sliding window, of the N received signals obtained after balance processing, where a length of the sliding window is the same as a length of the training sequence;

calculating delay time points of the N received signals obtained after balance processing, where a delay time point $T_i$ of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

With reference to the third possible implementation of the third aspect, the fourth possible implementation of the third aspect, or the fifth possible implementation of the third aspect, in a seventh possible implementation of the third aspect, the estimating delays of the N received signals obtained after balance processing includes:

calculating cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence;

calculating delay time points of the N received signals obtained after balance processing, where a delay time point $T_i$ of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

With reference to the third aspect, the first possible implementation of the third aspect, or the second possible implementation of the third aspect, in an eighth possible implementation of the third aspect, before the performing combining processing on the N received signals obtained after delay compensation, the processor performs balance processing on the N received signals obtained after delay compensation, to obtain N received signals obtained after balance processing; and the performing combining processing on the N received signals obtained after delay compensation includes: performing combining processing on the N received signals obtained after balance processing.

With reference to the eighth possible implementation of the third aspect, in a ninth possible implementation of the third aspect, the performing combining processing on the N received signals obtained after balance processing includes:

calculating a combining weight for the N received signals obtained after balance processing; performing, by using the calculated combining weight for the N received signals obtained after balance processing, weighted processing on the N received signals obtained after balance processing, to obtain N received signals obtained after balance processing and weighted processing; and combining the N received signals obtained after balance processing and weighted processing.

With reference to the ninth possible implementation of the third aspect, in a tenth possible implementation of the third aspect, the calculating a combining weight for the N received signals obtained after balance processing includes: calculating, based on a minimum mean square error criterion, the combining weight for the N received signals obtained after balance processing; or calculating, based on a least square criterion, the combining weight for the N received signals obtained after balance processing; or calculating, based on a maximum signal to noise ratio criterion, the combining weight for the N received signals obtained after balance processing.

With reference to the eighth possible implementation of the third aspect, the ninth possible implementation of the third aspect, or the tenth possible implementation of the third aspect, in an eleventh possible implementation of the third aspect, the estimating delays of the N received signals includes:

calculating cross correlation values between a training sequence and signal sequences, entering a sliding window, of the N received signals, where a length of the sliding window is the same as a length of the training sequence; and calculating delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculating the delays of the N received signals based on the calculated delay time points of the N received signals.

With reference to the eighth possible implementation of the third aspect, the ninth possible implementation of the third aspect, or the tenth possible implementation of the third aspect, in a twelfth possible implementation of the third aspect, the estimating delays of the N received signals includes:

calculating cross correlation values between a reference sequence and signal sequences, entering a sliding window, of the N received signals, where the reference sequence is an L-bit-long signal sequence of the $i^{th}$ received signal of the N received signals, and a width of the sliding window is the same as a width of the reference sequence; and calculating delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculating the delays of the N received signals based on the calculated delay time points of the N received signals.

With reference to any one of the third aspect, or the first to the twelfth possible implementations of the third aspect, in a thirteenth possible implementation of the third aspect, after the performing combining processing on the N received signals obtained after delay compensation, the processor further performs omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, changes a beam direction configuration of the antenna to ensure that beam directions of the antenna that are obtained after the configuration is changed include the direction Xi, where the direction Xi is different from any direction of the N directions, and the direction Xj is any direction of the N directions.

A fourth aspect of the embodiments of the present invention provides a wireless transmission device, including an antenna and any signal processing apparatus provided in the embodiments of the present invention.

It can be learned that after determining that there are N directions for received signals corresponding to a same signal source, a signal reception end in the embodiments of the present invention configures beam directions of an antenna as the N directions; estimates delays of the N received signals received by using the antenna, and separately performs, by using the estimated delays of the N received signals obtained after balance processing, delay compensation on the N received signals to obtain N received signals obtained after delay compensation, where the N received signals are in a one-to-one correspondence with the N directions; and performs combining processing on the N received signals obtained after delay compensation. Because N is an integer greater than 1, the N received signals corresponding to the N directions include multipath received signals corresponding to the same signal source. In addition, a problem about delays of the multipath received signals is considered in the foregoing solution. In this case, delay compensation is performed on N received signals obtained after balance processing, to obtain the N received signals obtained after delay compensation, and combining processing is performed on the N received signals obtained after delay compensation. The foregoing technical solution abandons a mechanism of eliminating multipath signals corresponding to a same signal source in a traditional technology, and makes full use of the multipath signals corresponding to the same signal source. It is found, by means of practices, that this manner helps increase a signal reception gain in a multipath scenario.

BRIEF DESCRIPTION OF DRAWINGS

To describe the technical solutions in the embodiments of the present invention more clearly, the following briefly describes the accompanying drawings required for describing the embodiments and the prior art. Apparently, the accompanying drawings in the following description show merely some embodiments of the present invention, and a person of ordinary skill in the art may still derive other drawings from these accompanying drawings without creative efforts.

FIG. 2-a is a schematic flowchart of another signal processing method according to an embodiment of the present invention;

FIG. 2-b is a schematic diagram of a wireless transmission device according to an embodiment of the present invention;

FIG. 2-c is a schematic diagram of a multipath scenario in which there is an obstacle according to an embodiment of the present invention;

FIG. 2-d is a schematic diagram of an entrance of a signal into a sliding window at several adjacent time points according to an embodiment of the present invention;

FIG. 3-a is a schematic flowchart of another signal processing method according to an embodiment of the present invention;

FIG. 3-b is a schematic diagram of another wireless transmission device according to an embodiment of the present invention;

FIG. 4-a is a schematic diagram of a signal processing apparatus according to an embodiment of the present invention;

FIG. 4-b is a schematic diagram of another signal processing apparatus according to an embodiment of the present invention;

FIG. 4-c is a schematic diagram of another signal processing apparatus according to an embodiment of the present invention;

FIG. 5-a is a schematic diagram of another signal processing apparatus according to an embodiment of the present invention;

FIG. 5-b is a schematic diagram of another signal processing apparatus according to an embodiment of the present invention;

FIG. 5-c is a schematic diagram of another signal processing apparatus according to an embodiment of the present invention;

FIG. 6 is a schematic diagram of another signal processing apparatus according to an embodiment of the present invention.

DESCRIPTION OF EMBODIMENTS

The embodiments of the present invention provide a signal processing method and a related device, so as to increase a signal reception gain in a multipath scenario.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

In an embodiment of a signal processing method of the present invention, the signal processing method may include: determining that there are N directions for received signals corresponding to a same signal source; configuring beam directions of an antenna as the N directions; estimating delays of the N received signals received by using the antenna, where the N received signals are in a one-to-one correspondence with the N directions, and N is an integer greater than 1; separately performing, by using the estimated delays of the N received signals, delay compensation on the N received signals to obtain N received signals obtained after delay compensation; and performing combining processing on the N received signals obtained after delay compensation.

Figure 1:
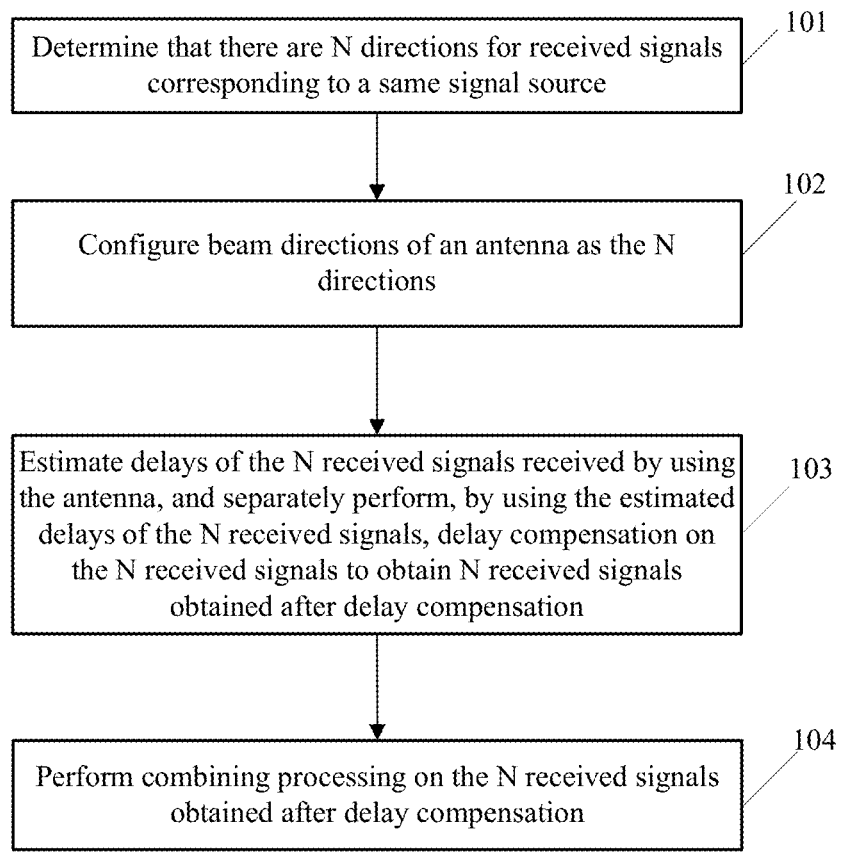
FIG. 1 is a schematic flowchart of a signal processing method according to an embodiment of the present invention.

First, referring to FIG. 1, FIG. 1 is a schematic flowchart of a signal processing method according to an embodiment of the present invention. As shown in FIG. 1, the signal processing method according to this embodiment of the present invention may include the following steps.

101: Determine that there are N directions for received signals corresponding to a same signal source.

In terms of the received signals corresponding to the same signal source, these received signals are generated after a same sent signal sent from the same signal source is transmitted through a wireless channel. When passing through a complex wireless channel, the same sent signal sent from the same signal source may be reflected (for example, there is an obstacle) or the like. Therefore, received signals that arrive at a receive end may come from multiple directions.

In an actual application, multiple manners may be used to determine that there are the N directions for the received signals corresponding to the same signal source. For example, an antenna may be used to perform omnidirectional scanning, to determine that there are X1 directions for received signals corresponding to the same signal source; and N directions in which received signal powers are higher among the X1 directions are determined as the N directions for the received signals corresponding to the same signal source. For another example, an antenna may be used to perform omnidirectional scanning, to determine that there are X1 directions for received signals corresponding to the same signal source; and any N directions of the X1 directions are determined as the N directions for the received signals corresponding to the same signal source. X1 is greater than or equal to N. For another example, an antenna may be used to perform omnidirectional scanning, to determine that there are X1 directions for received signals corresponding to the same signal source; and a direction, in which a received signal power is the highest, of the X1 directions and any N−1 directions of X1−1 directions of the X1 directions except the direction in which the received signal power is the highest are determined as the N directions for the received signals corresponding to the same signal source, where X1 is greater than or equal to N.

102: Configure beam directions of an antenna as the N directions.

Optionally, in some possible implementations of the present invention, the configuring beam directions of an antenna as the N directions may include: configuring beam directions of a multibeam antenna as the N directions; or configuring beam directions of N single-beam antennas as the N directions, where the N single-beam antennas are in a one-to-one correspondence with the N directions. Certainly, another manner may be used to configure the beam directions of the antenna as the N directions.

103: Estimate delays of the N received signals received by using the antenna, and separately perform, by using the estimated delays of the N received signals, delay compensation on the N received signals to obtain N received signals obtained after delay compensation.

The received signals mentioned in each embodiment of the present invention may be, for example, microwave signals (for example, millimeter-wave signals) or signals having another wavelength.

The N received signals are in a one-to-one correspondence with the N directions.

The N received signals are in a one-to-one correspondence with the N received signals obtained after delay compensation.

The estimating delays of the N received signals received by using the antenna is estimating a delay between the N received signals received by using the antenna.

104: Perform combining processing on the N received signals obtained after delay compensation.

Further, demodulation processing may be further performed on a combined signal obtained by performing combining processing on the N received signals obtained after delay compensation.

The solution in this embodiment may be executed by a signal processing apparatus, a wireless transmission device (for example, a relay station, a base station, or a wireless backhaul device such as a small-cell backhaul device), or the like.

It can be learned that after determining that there are N directions for received signals corresponding to a same signal source, a signal reception end in this embodiment of the present invention configures beam directions of an antenna as the N directions; estimates delays of the N received signals received by using the antenna, and separately performs, by using the estimated delays of the N received signals obtained after balance processing, delay compensation on the N received signals to obtain N received signals obtained after delay compensation, where the N received signals are in a one-to-one correspondence with the N directions; and performs combining processing on the N received signals obtained after delay compensation. Because N is an integer greater than 1, the N received signals corresponding to the N directions include multipath received signals corresponding to the same signal source. In addition, a problem about delays of the multipath received signals is considered in the foregoing solution. In this case, delay compensation is performed on N received signals obtained after balance processing, to obtain the N received signals obtained after delay compensation, and combining processing is performed on the N received signals obtained after delay compensation. The foregoing technical solution abandons a mechanism of eliminating multipath signals corresponding to a same signal source in a traditional technology, and makes full use of the multipath signals corresponding to the same signal source. It is found, by means of practices, that this manner helps increase a signal reception gain in a multipath scenario.

Optionally, in some possible implementations of the present invention, before the estimating delays of the N received signals received by using the antenna, the method may further include: performing balance processing on the N received signals received by using the antenna, to obtain N received signals obtained after balance processing. The estimating delays of the N received signals received by using the antenna, and separately performing, by using the estimated delays of the N received signals, delay compensation on the N received signals to obtain N received signals obtained after delay compensation may include, for example: estimating delays of the N received signals obtained after balance processing, and separately performing, by using the estimated delays of the N received signals obtained after balance processing, delay compensation on the N received signals obtained after balance processing to obtain the N received signals obtained after delay compensation.

Optionally, in some possible implementations of the present invention, the performing combining processing on the N received signals obtained after delay compensation may include: calculating a combining weight for the N received signals obtained after delay compensation; performing, by using the calculated combining weight for the N received signals obtained after delay compensation, weighted processing on the N received signals obtained after delay compensation, to obtain N received signals obtained after delay compensation and weighted processing; and combining the N received signals obtained after delay compensation and weighted processing.

Optionally, in some possible implementations of the present invention, the calculating a combining weight for the N received signals obtained after delay compensation may include: calculating, based on a minimum mean square error criterion, the combining weight for the N received signals obtained after delay compensation; or calculating, based on a least square criterion, the combining weight for the N received signals obtained after delay compensation; or calculating, based on a maximum signal to noise ratio criterion, the combining weight for the N received signals obtained after delay compensation. Certainly, another mechanism may be used to calculate the combining weight for the N received signals obtained after delay compensation. For example, among the N received signals obtained after delay compensation, a received signal obtained after delay compensation whose received signal power is higher is corresponding to a greater combining weight, that is, when a received signal power corresponding to the $i^{th}$ received signal obtained after delay compensation is higher than a received signal power corresponding to the $j^{th}$ received signal obtained after delay compensation, a combining weight for the $i^{th}$ received signal obtained after delay compensation is greater than or equal to a combining weight for the $j^{th}$ received signal obtained after delay compensation. For another example, among the N received signals obtained after delay compensation, a received signal obtained after delay compensation whose signal to noise ratio is greater is corresponding to a greater combining weight, that is, when a signal to noise ratio corresponding to the $i^{th}$ received signal obtained after delay compensation is greater than a signal to noise ratio corresponding to the $j^{th}$ received signal obtained after delay compensation, a combining weight for the $i^{th}$ received signal obtained after delay compensation is greater than or equal to a combining weight for the $j^{th}$ received signal obtained after delay compensation. Certainly, this embodiment of the present invention is not limited to the foregoing examples of the manner for calculating the combining weight for the N received signals obtained after delay compensation.

It can be understood that, for example, if the combining weight for the N received signals obtained after delay compensation is calculated based on the minimum mean square error criterion, or the combining weight for the N received signals obtained after delay compensation is calculated based on the least square criterion, or the combining weight for the N received signals obtained after delay compensation is calculated based on the maximum signal to noise ratio criterion, because a significance difference of the N received signals obtained after delay compensation is considered to a specific extent, the calculated combining weight for the N received signals obtained after delay compensation better meets an expected effect, thereby further helping increase a signal reception gain in a multipath scenario.

Optionally, in some possible implementations of the present invention, the estimating delays of the N received signals obtained after balance processing may include: calculating cross correlation values between a training sequence and signal sequences, entering a sliding window, of the N received signals obtained after balance processing, where a length of the sliding window is the same as a length of the training sequence; calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

Optionally, in some possible implementations of the present invention, the estimating delays of the N received signals obtained after balance processing includes: calculating cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence; calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

The sliding window may be a physical first-in first-out buffer. One or more bits may enter/come out of the sliding window each time.

Optionally, in some possible implementations of the present invention, before the performing combining processing on the N received signals obtained after delay compensation, the method further includes: performing balance processing on the N received signals obtained after delay compensation, to obtain N received signals obtained after balance processing. The performing combining processing on the N received signals obtained after delay compensation may include: performing combining processing on the N received signals obtained after balance processing.

Optionally, in some possible implementations of the present invention, the performing combining processing on the N received signals obtained after balance processing may include: calculating a combining weight for the N received signals obtained after balance processing; performing, by using the calculated combining weight for the N received signals obtained after balance processing, weighted processing on the N received signals obtained after balance processing, to obtain N received signals obtained after balance processing and weighted processing; and combining the N received signals obtained after balance processing and weighted processing.

Optionally, in some possible implementations of the present invention, the calculating a combining weight for the N received signals obtained after balance processing includes: calculating, based on a minimum mean square error criterion, the combining weight for the N received signals obtained after balance processing; or calculating, based on a least square criterion, the combining weight for the N received signals obtained after balance processing; or calculating, based on a maximum signal to noise ratio criterion, the combining weight for the N received signals obtained after balance processing.

Optionally, in some possible implementations of the present invention, the estimating delays of the N received signals may include: calculating cross correlation values between a training sequence and signal sequences, entering a sliding window, of the N received signals, where a length of the sliding window is the same as a length of the training sequence; and calculating delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculating the delays of the N received signals based on the calculated delay time points of the N received signals.

Optionally, in some possible implementations of the present invention, the estimating delays of the N received signals may include: calculating cross correlation values between a reference sequence and signal sequences, entering a sliding window, of the N received signals, where the reference sequence is an L-bit-long signal sequence of the $i^{th}$ received signal of the N received signals, and a width of the sliding window is the same as a width of the reference sequence; and calculating delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculating the delays of the N received signals based on the calculated delay time points of the N received signals.

Optionally, in some possible implementations of the present invention, after the performing combining processing on the N received signals obtained after delay compensation, the method may further include: performing omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, changing a beam direction configuration of the antenna to ensure that beam directions of the antenna that are obtained after the configuration is changed include the direction Xi, where the direction Xi is different from any direction of the N directions, and the direction Xj is different from any direction of the N directions.

An intersection set between a set of the X2 directions and a set of the X1 directions may be an empty set or a non-empty set.

It can be understood that the beam direction configuration of the antenna may be further adjusted adaptively according to an omnidirectional scanning result. Therefore, this helps achieve a better effect or an optimal effect of configuring the beam directions of the antenna, and further helps increase a signal reception gain in a multipath scenario.

For better understanding and implementation of the foregoing solutions in this embodiment of the present invention, some specific application scenarios are used as an example for description in the following.

Referring to FIG. 2-a and FIG. 2-b, FIG. 2-a is a schematic flowchart of a signal processing method according to another embodiment of the present invention. The signal processing method shown in FIG. 2-a may be, for example, specifically implemented on a wireless transmission device in an architecture shown in FIG. 2-b. The wireless transmission device in the architecture shown in FIG. 2-b includes a scanning antenna and a multibeam antenna. As shown in FIG. 2-a, the signal processing method according to the another embodiment of the present invention may include the following steps.

201: A wireless transmission device performs omnidirectional scanning by using a scanning antenna, to determine that there are X1 directions for received signals corresponding to a same signal source.

X1 is an integer greater than 1. For example, X1 is equal to 2, 3, 4, 5, 10, 15, or another value.

The wireless transmission device in this embodiment may be, for example, a relay station, a base station, or a wireless backhaul device such as a small-cell backhaul device.

202: The wireless transmission device determines, as N directions for received signals corresponding to the same signal source, N directions in which received signal powers are higher among the X1 directions.

N is an integer greater than 1. For example, N is equal to 2, 3, 4, 5, 9, 13, 14, or another value.

Alternatively, in some other possible implementations, the wireless transmission device may determine any N directions of the X1 directions as N directions for received signals corresponding to the same signal source. X1 is greater than or equal to N. For another example, the wireless transmission device may perform omnidirectional scanning by using the antenna, to determine that there are X1 directions for received signals corresponding to the same signal source; and determine a direction, in which a received signal power is the highest, of the X1 directions and any N−1 directions of X1−1 directions of the X1 directions except the direction in which the received signal power is the highest as N directions for received signals corresponding to the same signal source. X1 is greater than or equal to N.

203: The wireless transmission device configures beam directions of a multibeam antenna of the wireless transmission device as the N directions.

Optionally, in some possible implementations of the present invention, the wireless transmission device may configure phase shifter circuits or multiplier circuits connected to the multibeam antenna, to configure the beam directions of the multibeam antenna of the wireless transmission device as the N directions.

204: The wireless transmission device performs balance processing on the N received signals received by using the multibeam antenna, to obtain N received signals obtained after balance processing.

The N received signals are in a one-to-one correspondence with the N directions.

The N received signals are in a one-to-one correspondence with the N received signals obtained after balance processing.

205: The wireless transmission device estimates delays of the N received signals obtained after balance processing.

Optionally, in some possible implementations of the present invention, the estimating delays of the N received signals obtained after balance processing may include, for example: calculating cross correlation values between a training sequence and signal sequences, entering a sliding window, of the N received signals obtained after balance processing, where a length of the sliding window is the same as a length of the training sequence; calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing may be any one of the N received signals obtained after balance processing; and calculating, based on the calculated delay time points of the N received signals obtained after balance processing, the delays of the N received signals obtained after balance processing.

The training sequence is known to both a signal sending end and a signal reception end. The length of the training sequence may be configured according to an actual demand.

Optionally, in some possible implementations of the present invention, the estimating delays of the N received signals obtained after balance processing includes: calculating cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence; calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

For example, a formula for calculating a cross correlation value between two signal sequences may be as follows:

$$R_i(n) \frac{1}{L} \sum_{m=1}^{L} |s^*(m) * y_i(m+n)|,$$

where L represents a length of a training sequence, s(m) represents the training sequence, $y_i(m+n)$ represents a signal sequence, which enters a sliding window and whose receiving time point is a time point n, of the $i^{th}$ received signal, $R_i(n)$ represents a cross correlation value between the training sequence and the signal sequence, which enters the sliding window and whose receiving time point is the time point n, of the $i^{th}$ received signal, and m=1, . . . , L.

$i^{th}$ For example, it is assumed that Ti represents a delay time point of the received signal obtained after balance processing, and Tj represents a delay time point of the $j^{th}$ received signal obtained after balance processing. If Tj is used as a reference, a delay $\Delta T_i$ of the $i^{th}$ received signal obtained after balance processing is calculated, where $\Delta T_i = T_j - T_i$. A delay of another received signal obtained after balance processing is calculated in the same manner. It can be understood that because Tj is used as the reference, a delay $\Delta T_j$ of the $j^{th}$ received signal obtained after balance processing is equal to 0.

Certainly, another time point (for example, an average value or a greatest value of the delay time points of the N received signals obtained after balance processing) may alternatively be used as a reference, and a similar specific calculation manner is used.

The sliding window may be a physical first-in first-out buffer. One or more bits may enter/come out of the sliding window each time. For example, as shown in FIG. 2-d, FIG. 2-d shows signal sequences, entering the sliding window at several adjacent time points, of the $i^{th}$ received signal obtained after balance processing. In FIG. 2-d, an example in which one bit may enter/come out of the sliding window each time is used.

206: The wireless transmission device separately performs, by using the estimated delays of the N received signals obtained after balance processing, delay compensation on the N received signals obtained after balance processing to obtain N received signals obtained after delay compensation.

Specifically, the wireless transmission device may perform, by using an estimated delay of the $i^{th}$ received signal obtained after balance processing, delay compensation on the $i^{th}$ received signal obtained after balance processing, to obtain the $i^{th}$ received signal obtained after delay compensation. The wireless transmission device performs, by using an estimated delay of the $j^{th}$ received signal obtained after balance processing, delay compensation on the $j^{th}$ received signal obtained after balance processing, to obtain the $j^{th}$ received signal obtained after delay compensation. The same manner is used to perform delay compensation on another received signal obtained after balance processing. The $i^{th}$ received signal obtained after balance processing is any one of the N received signals obtained after balance processing.

207: The wireless transmission device performs combining processing on the N received signals obtained after delay compensation.

Optionally, in some possible implementations of the present invention, the performing, by the wireless transmission device, combining processing on the N received signals obtained after delay compensation may include, for example: calculating a combining weight for the N received signals obtained after delay compensation; performing, by using the calculated combining weight for the N received signals obtained after delay compensation, weighted processing on the N received signals obtained after delay compensation, to obtain N received signals obtained after delay compensation and weighted processing; and combining the N received signals obtained after delay compensation and weighted processing.

Specifically, a calculated combining weight for the $i^{th}$ received signal obtained after delay compensation may be used to perform weighted processing on the $i^{th}$ received signal obtained after delay compensation, to obtain the $i^{th}$ received signal obtained after delay compensation and weighted processing. A calculated combining weight for the $j^{th}$ received signal obtained after delay compensation may be used to perform weighted processing on the $j^{th}$ received signal obtained after delay compensation, to obtain the $j^{th}$ received signal obtained after delay compensation and weighted processing. The same manner is used to perform weighted processing on another received signal obtained after delay compensation. The $i^{th}$ received signal obtained after delay compensation is any one of the N received signals obtained after delay compensation.

Optionally, in some possible implementations of the present invention, the calculating a combining weight for the N received signals obtained after delay compensation may include: calculating, based on a minimum mean square error criterion, the combining weight for the N received signals obtained after delay compensation; or calculating, based on a least square criterion, the combining weight for the N received signals obtained after delay compensation; or calculating, based on a maximum signal to noise ratio criterion, the combining weight for the N received signals obtained after delay compensation. Certainly, another mechanism may be used to calculate the combining weight for the N received signals obtained after delay compensation. For example, among the N received signals obtained after delay compensation, a received signal obtained after delay compensation whose received signal power is higher is corresponding to a greater combining weight, that is, when a received signal power corresponding to the $i^{th}$ received signal obtained after delay compensation is higher than a received signal power corresponding to the $j^{th}$ received signal obtained after delay compensation, a combining weight for the $i^{th}$ received signal obtained after delay compensation is greater than or equal to a combining weight for the $j^{th}$ received signal obtained after delay compensation. For another example, among the N received signals obtained after delay compensation, a received signal obtained after delay compensation whose signal to noise ratio is greater is corresponding to a greater combining weight, that is, when a signal to noise ratio corresponding to the $i^{th}$ received signal obtained after delay compensation is greater than a signal to noise ratio corresponding to the $j^{th}$ received signal obtained after delay compensation, a combining weight for the $i^{th}$ received signal obtained after delay compensation is greater than or equal to a combining weight for the $j^{th}$ received signal obtained after delay compensation. Certainly, this embodiment of the present invention is not limited to the foregoing examples of the manner for calculating the combining weight for the N received signals obtained after delay compensation.

It can be understood that, for example, if the combining weight for the N received signals obtained after delay compensation is calculated based on the minimum mean square error criterion, or the combining weight for the N received signals obtained after delay compensation is calculated based on the least square criterion, or the combining weight for the N received signals obtained after delay compensation is calculated based on the maximum signal to noise ratio criterion, because a significance difference of the N received signals obtained after delay compensation is considered to a specific extent, the calculated combining weight for the N received signals obtained after delay compensation better meets an expected effect, thereby further helping increase a signal reception gain in a multipath scenario.

Further, the wireless transmission device may further perform demodulation processing on a combined signal obtained by performing combining processing on the N received signals obtained after delay compensation.

Optionally, in some possible implementations of the present invention, after performing combining processing on the N received signals obtained after delay compensation, the wireless transmission device may further perform omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, change a beam direction configuration of the antenna to ensure that beam directions of the antenna that are obtained after the configuration is changed include the direction Xi. The direction Xi is different from any direction of the N directions, and the direction Xj is any direction of the N directions.

An intersection set between a set of the X2 directions and a set of the X1 directions may be an empty set or a non-empty set.

For example, the wireless transmission device may periodically perform omnidirectional scanning by using the antenna, to determine that there are one or more directions for a received signal or received signals corresponding to the same signal source.

It can be understood that the beam direction configuration of the antenna may be further adjusted adaptively according to an omnidirectional scanning result. Therefore, this helps achieve a better effect or an optimal effect of configuring the beam directions of the antenna, and further helps increase a signal reception gain in a multipath scenario.

It can be learned that, in this embodiment, after determining that there are N directions for received signals corresponding to a same signal source, a wireless transmission device configures beam directions of a multibeam antenna as the N directions; performs balance processing on the N received signals received by using the multibeam antenna, to obtain N received signals obtained after balance processing, where the N received signals are in a one-to-one correspondence with the N directions; estimates delays of the N received signals obtained after balance processing, and separately performs, by using the estimated delays of the N received signals obtained after balance processing, delay compensation on the N received signals obtained after balance processing to obtain N received signals obtained after delay compensation; and performs combining processing on the N received signals obtained after delay compensation. Because N is an integer greater than 1, the N received signals corresponding to the N directions include multipath received signals corresponding to the same signal source. In addition, a problem about delays of the multipath received signals is considered in the foregoing solution. In this case, delay compensation is performed on N received signals obtained after balance processing, to obtain the N received signals obtained after delay compensation, and combining processing is performed on the N received signals obtained after delay compensation. The foregoing technical solution abandons a mechanism of eliminating multipath signals corresponding to a same signal source in a traditional technology, and makes full use of the multipath signals corresponding to the same signal source. It is found, by means of practices, that this manner helps increase a signal reception gain in a multipath scenario.

For better understanding and implementation of the foregoing solutions in this embodiment of the present invention, some specific application scenarios are used as an example for description in the following.

Referring to FIG. 3-a and FIG. 3-b, FIG. 3-a is a schematic flowchart of a signal processing method according to another embodiment of the present invention. The signal processing method shown in FIG. 3-a may be, for example, specifically implemented on a wireless transmission device in an architecture shown in FIG. 3-b. The wireless transmission device in the architecture shown in FIG. 3-b includes a scanning antenna and N single-beam antennas. As shown in FIG. 3-a, the signal processing method according to the another embodiment of the present invention may include the following steps.

301: A wireless transmission device performs omnidirectional scanning by using a scanning antenna, to determine that there are X1 directions for received signals corresponding to a same signal source.

X1 is an integer greater than 1. For example, X1 is equal to 2, 3, 4, 5, 10, 15, or another value.

The wireless transmission device in this embodiment may be, for example, a relay station, a base station, or a wireless backhaul device such as a small-cell backhaul device.

302: The wireless transmission device determines, as N directions for received signals corresponding to the same signal source, N directions in which received signal powers are higher among the X1 directions.

N is an integer greater than 1. For example, N is equal to 2, 3, 4, 5, 9, 13, 14, or another value.

Alternatively, in some other possible implementations, the wireless transmission device may determine any N directions of the X1 directions as N directions for received signals corresponding to the same signal source. X1 is greater than or equal to N. For another example, the wireless transmission device may perform omnidirectional scanning by using the antenna, to determine that there are X1 directions for received signals corresponding to the same signal source; and determine a direction, in which a received signal power is the highest, of the X1 directions and any N−1 directions of X1−1 directions of the X1 directions except the direction in which the received signal power is the highest as N directions for received signals corresponding to the same signal source. X1 is greater than or equal to N.

303: The wireless transmission device configures beam directions of N single-beam antennas of the wireless transmission device as the N directions.

The N single-beam antennas are in a one-to-one correspondence with the N directions. That is, beam directions of different antennas of the N single-beam antennas are configured as different directions of the N directions.

Optionally, in some possible implementations of the present invention, the wireless transmission device may configure phase shifter circuits or multiplier circuits that are connected to the N single-beam antennas, to configure the beam directions of the N single-beam antennas of the wireless transmission device as the N directions.

304: The wireless transmission device performs balance processing on the N received signals received by using the N single-beam antennas, to obtain N received signals obtained after balance processing.

The N received signals are in a one-to-one correspondence with the N directions.

The N received signals are in a one-to-one correspondence with the N received signals obtained after balance processing.

305: The wireless transmission device estimates delays of the N received signals obtained after balance processing.

Optionally, in some possible implementations of the present invention, the estimating delays of the N received signals obtained after balance processing may include, for example: calculating cross correlation values between a training sequence and signal sequences, entering a sliding window, of the N received signals obtained after balance processing, where a length of the sliding window is the same as a length of the training sequence; calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing may be any one of the N received signals obtained after balance processing; and calculating, based on the calculated delay time points of the N received signals obtained after balance processing, the delays of the N received signals obtained after balance processing.

The training sequence is known to both a signal sending end and a signal reception end. The length of the training sequence may be configured according to an actual demand.

Optionally, in some possible implementations of the present invention, the estimating delays of the N received signals obtained after balance processing includes: calculating cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence; calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

For example, a formula for calculating a cross correlation value between two signal sequences may be as follows:

$$R_i(n) \frac{1}{L} \sum_{m=1}^{L} |s^*(m) * y_i(m+n)|,$$

where L represents a length of a training sequence, s(m) represents the training sequence, $y_i(m+n)$ represents a signal sequence, which enters a sliding window and whose receiving time point is a time point n, of the $i^{th}$ received signal, $R_i(n)$ represents a cross correlation value between the training sequence and the signal sequence, which enters the sliding window and whose receiving time point is the time point n, of the $i^{th}$ received signal, and m=1, . . . , L.

For example, it is assumed that Ti represents a delay time point of the $i^{th}$ received signal obtained after balance processing, and Tj represents a delay time point of the $j^{th}$ received signal obtained after balance processing. If Tj is used as a reference, a delay $\Delta T_i$ of the $i^{th}$ received signal obtained after balance processing is calculated, where $\Delta T_i = T_j - T_i$. A delay of another received signal obtained after balance processing is calculated in the same manner. It can be understood that because Tj is used as the reference, a delay $\Delta T_j$ of the $j^{th}$ received signal obtained after balance processing is equal to 0.

Certainly, another time point (for example, an average value or a greatest value of the delay time points of the N received signals obtained after balance processing) may alternatively be used as a reference, and a similar specific calculation manner is used.

The sliding window may be a physical first-in first-out buffer. One or more bits may enter/come out of the sliding window each time. For example, as shown in FIG. 2-d, FIG. 2-d shows signal sequences, entering the sliding window at several adjacent time points, of the $i^{th}$ received signal obtained after balance processing. In FIG. 2-d, an example in which one bit may enter/come out of the sliding window each time is used.

306: The wireless transmission device separately performs, by using the estimated delays of the N received signals obtained after balance processing, delay compensation on the N received signals obtained after balance processing to obtain N received signals obtained after delay compensation.

Specifically, the wireless transmission device may perform, by using an estimated delay of the $i^{th}$ received signal obtained after balance processing, delay compensation on the $i^{th}$ received signal obtained after balance processing, to obtain the $i^{th}$ received signal obtained after delay compensation. The wireless transmission device performs, by using an estimated delay of the $j^{th}$ received signal obtained after balance processing, delay compensation on the $j^{th}$ received signal obtained after balance processing, to obtain the $j^{th}$ received signal obtained after delay compensation. The same manner is used to perform delay compensation on another received signal obtained after balance processing. The $i^{th}$ received signal obtained after balance processing is any one of the N received signals obtained after balance processing.

307: The wireless transmission device performs combining processing on the N received signals obtained after delay compensation.

Optionally, in some possible implementations of the present invention, the performing, by the wireless transmission device, combining processing on the N received signals obtained after delay compensation may include, for example: calculating a combining weight for the N received signals obtained after delay compensation; performing, by using the calculated combining weight for the N received signals obtained after delay compensation, weighted processing on the N received signals obtained after delay compensation, to obtain N received signals obtained after delay compensation and weighted processing; and combining the N received signals obtained after delay compensation and weighted processing.

Specifically, a calculated combining weight for the $i^{th}$ received signal obtained after delay compensation may be used to perform weighted processing on the $i^{th}$ received signal obtained after delay compensation, to obtain the $i^{th}$ received signal obtained after delay compensation and weighted processing. A calculated combining weight for the $j^{th}$ received signal obtained after delay compensation may be used to perform weighted processing on the $j^{th}$ received signal obtained after delay compensation, to obtain the $j^{th}$ received signal obtained after delay compensation and weighted processing. The same manner is used to perform weighted processing on another received signal obtained after delay compensation. The $i^{th}$ received signal obtained after delay compensation is any one of the N received signals obtained after delay compensation.

Optionally, in some possible implementations of the present invention, the calculating a combining weight for the N received signals obtained after delay compensation may include: calculating, based on a minimum mean square error criterion, the combining weight for the N received signals obtained after delay compensation; or calculating, based on a least square criterion, the combining weight for the N received signals obtained after delay compensation; or calculating, based on a maximum signal to noise ratio criterion, the combining weight for the N received signals obtained after delay compensation. Certainly, another mechanism may be used to calculate the combining weight for the N received signals obtained after delay compensation. For example, among the N received signals obtained after delay compensation, a received signal obtained after delay compensation whose received signal power is higher is corresponding to a greater combining weight, that is, when a received signal power corresponding to the $i^{th}$ received signal obtained after delay compensation is higher than a received signal power corresponding to the $j^{th}$ received signal obtained after delay compensation, a combining weight for the $i^{th}$ received signal obtained after delay compensation is greater than or equal to a combining weight for the $j^{th}$ received signal obtained after delay compensation. For another example, among the N received signals obtained after delay compensation, a received signal obtained after delay compensation whose signal to noise ratio is greater is corresponding to a greater combining weight, that is, when a signal to noise ratio corresponding to the $i^{th}$ received signal obtained after delay compensation is greater than a signal to noise ratio corresponding to the $j^{th}$ received signal obtained after delay compensation, a combining weight for the $i^{th}$ received signal obtained after delay compensation is greater than or equal to a combining weight for the $j^{th}$ received signal obtained after delay compensation. Certainly, this embodiment of the present invention is not limited to the foregoing examples of the manner for calculating the combining weight for the N received signals obtained after delay compensation.

It can be understood that, for example, if the combining weight for the N received signals obtained after delay compensation is calculated based on the minimum mean square error criterion, or the combining weight for the N received signals obtained after delay compensation is calculated based on the least square criterion, or the combining weight for the N received signals obtained after delay compensation is calculated based on the maximum signal to noise ratio criterion, because a significance difference of the N received signals obtained after delay compensation is considered to a specific extent, the calculated combining weight for the N received signals obtained after delay compensation better meets an expected effect, thereby further helping increase a signal reception gain in a multipath scenario.

Further, the wireless transmission device may further perform demodulation processing on a combined signal obtained by performing combining processing on the N received signals obtained after delay compensation.

Optionally, in some possible implementations of the present invention, after performing combining processing on the N received signals obtained after delay compensation, the wireless transmission device may further perform omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, change a beam direction configuration of the antenna to ensure that beam directions of the antenna that are obtained after the configuration is changed include the direction Xi. The direction Xi is different from any direction of the N directions, and the direction Xj is any direction of the N directions.

An intersection set between a set of the X2 directions and a set of the X1 directions may be an empty set or a non-empty set.

For example, the wireless transmission device may periodically perform omnidirectional scanning by using the antenna, to determine that there are one or more directions for a received signal or received signals corresponding to the same signal source.

It can be understood that the beam direction configuration of the antenna may be further adjusted adaptively according to an omnidirectional scanning result. Therefore, this helps achieve a better effect or an optimal effect of configuring the beam directions of the antenna, and further helps increase a signal reception gain in a multipath scenario.

It can be learned that, in this embodiment, after determining that there are N directions for received signals corresponding to a same signal source, a wireless transmission device configures beam directions of N single-beam antennas as the N directions; performs balance processing on the N received signals received by using the N single-beam antennas, to obtain N received signals obtained after balance processing, where the N received signals are in a one-to-one correspondence with the N directions; estimates delays of the N received signals obtained after balance processing, and separately performs, by using the estimated delays of the N received signals obtained after balance processing, delay compensation on the N received signals obtained after balance processing to obtain N received signals obtained after delay compensation; and performs combining processing on the N received signals obtained after delay compensation. Because N is an integer greater than 1, the N received signals corresponding to the N directions include multipath received signals corresponding to the same signal source. In addition, a problem about delays of the multipath received signals is considered in the foregoing solution. In this case, delay compensation is performed on N received signals obtained after balance processing, to obtain the N received signals obtained after delay compensation, and combining processing is performed on the N received signals obtained after delay compensation. The foregoing technical solution abandons a mechanism of eliminating multipath signals corresponding to a same signal source in a traditional technology, and makes full use of the multipath signals corresponding to the same signal source. It is found, in a practice process, that this manner helps increase a signal reception gain in a multipath scenario.

It can be understood that an example in which balance processing is first performed on a received signal, then delay compensation is performed on an obtained signal, and then combining processing is performed is used in the embodiments corresponding to FIG. 2-$a$ and FIG. 3-$a$. Certainly, in another implementation, delay compensation may be first performed on a received signal, then balance processing may be performed on an obtained signal, and then combining processing may be performed. A specific implementation process may be implemented by analogy.

Referring to FIG. 4-$a$, an embodiment of the present invention further provides a signal processing apparatus

400. The signal processing apparatus 400 may include a primary control unit 410, a delay estimation unit 430, a delay compensation unit 440, and a combining unit 450.

The primary control unit 410 is configured to: determine that there are N directions for received signals corresponding to a same signal source; and configure beam directions of an antenna as the N directions.

The delay estimation unit 430 is configured to estimate delays of the N received signals received by using the antenna.

The delay compensation unit 440 is configured to separately perform, by using the estimated delays of the received signals, delay compensation on the N received signals to obtain N received signals obtained after delay compensation.

The combining unit 450 is configured to perform combining processing on the N received signals obtained after delay compensation.

Optionally, in some possible implementations of the present invention, the primary control unit 410 is specifically configured to: perform omnidirectional scanning by using the antenna, to determine that there are X1 directions for received signals corresponding to the same signal source; determine, as the N directions for the received signals corresponding to the same signal source, N directions in which received signal powers are higher among the X1 directions; and configure the beam directions of the antenna as the N directions.

Optionally, in some possible implementations of the present invention, in the aspect of configuring beam directions of an antenna as the N directions, the primary control unit 410 is specifically configured to:

configure beam directions of a multibeam antenna as the N directions; or configure beam directions of N single-beam antennas as the N directions, where the N single-beam antennas are in a one-to-one correspondence with the N directions.

Referring to FIG. 4-b, optionally, in some possible implementations of the present invention, the signal processing apparatus 400 may further include a balancing unit 420, configured to perform balance processing on the N received signals received by using the antenna, to obtain N received signals obtained after balance processing, where the N received signals are in a one-to-one correspondence with the N directions.

The delay estimation unit 430 is specifically configured to estimate delays of the N received signals obtained after balance processing.

The delay compensation unit 440 is specifically configured to: separately perform, by using the estimated delays of the N received signals obtained after balance processing, delay compensation on the N received signals obtained after balance processing to obtain the N received signals obtained after delay compensation.

Optionally, in some possible implementations of the present invention, the combining unit 450 is specifically configured to: calculate a combining weight for the N received signals obtained after delay compensation; perform, by using the calculated combining weight for the N received signals obtained after delay compensation, weighted processing on the N received signals obtained after delay compensation, to obtain N received signals obtained after delay compensation and weighted processing; and combine the N received signals obtained after delay compensation and weighted processing.

Optionally, in some possible implementations of the present invention, in the aspect of calculating a combining weight for the N received signals obtained after delay compensation, the combining unit 450 is specifically configured to: calculate, based on a minimum mean square error criterion, the combining weight for the N received signals obtained after delay compensation; or calculate, based on a least square criterion, the combining weight for the N received signals obtained after delay compensation; or calculate, based on a maximum signal to noise ratio criterion, the combining weight for the N received signals obtained after delay compensation.

Optionally, in some possible implementations of the present invention, the delay estimation unit 430 is specifically configured to: calculate cross correlation values between a training sequence and signal sequences, entering a sliding window, of the N received signals obtained after balance processing, where a length of the sliding window is the same as a length of the training sequence; calculate delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculate, based on the calculated delay time points of the N received signals obtained after balance processing, the delays of the N received signals obtained after balance processing.

Optionally, in some possible implementations of the present invention, the delay estimation unit 430 may be specifically configured to: calculate cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence; calculate delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculate, based on the calculated delay time points of the N received signals obtained after balance processing, the delays of the N received signals obtained after balance processing.

Referring to FIG. 4-c, optionally, in some possible implementations of the present invention, the signal processing apparatus 400 may further include a balancing unit 420, configured to: before combining processing is performed on the N received signals obtained after delay compensation, perform balance processing on the N received signals obtained after delay compensation, to obtain N received signals obtained after balance processing.

The combining unit 450 is specifically configured to perform combining processing on the N received signals obtained after balance processing.

Optionally, in some possible implementations of the present invention, the combining unit 450 is specifically configured to: calculate a combining weight for the N received signals obtained after balance processing; perform, by using the calculated combining weight for the N received signals obtained after balance processing, weighted processing on the N received signals obtained after balance processing, to obtain N received signals obtained after balance processing and weighted processing; and combine the N received signals obtained after balance processing and weighted processing.

Optionally, in some possible implementations of the present invention, in the aspect of calculating a combining weight for the N received signals obtained after balance processing, the combining unit 450 is specifically configured to: calculate, based on a minimum mean square error criterion, the combining weight for the N received signals obtained after balance processing; or calculate, based on a least square criterion, the combining weight for the N received signals obtained after balance processing; or calculate, based on a maximum signal to noise ratio criterion, the combining weight for the N received signals obtained after balance processing.

Optionally, in some possible implementations of the present invention, the delay estimation unit 430 is specifically configured to: calculate cross correlation values between a training sequence and signal sequences, entering a sliding window, of the N received signals, where a length of the sliding window is the same as a length of the training sequence; calculate delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculate the delays of the N received signals based on the calculated delay time points of the N received signals.

Optionally, in some possible implementations of the present invention, the delay estimation unit 430 may be specifically configured to: calculate cross correlation values between a reference sequence and signal sequences, entering a sliding window, of the N received signals, where the reference sequence is an L-bit-long signal sequence of the $i^{th}$ received signal of the N received signals, and a width of the sliding window is the same as a width of the reference sequence; calculate delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculate the delays of the N received signals based on the calculated delay time points of the N received signals.

Optionally, in some possible implementations of the present invention, the primary control unit 410 is further configured to: after combining processing is performed on the N received signals obtained after delay compensation, perform omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, change a beam direction configuration of the antenna to ensure that beam directions of the antenna that are obtained after the configuration is changed include the direction Xi, where the direction Xi is different from any direction of the N directions, and the direction Xj is any direction of the N directions.

Optionally, in some possible implementations of the present invention, the signal processing apparatus 400 may further include a demodulation processing unit 460, configured to perform demodulation processing on a combined signal obtained by performing combining processing on the N received signals obtained after delay compensation.

The signal processing apparatus 400 is a wireless transmission device, or may be deployed in a wireless transmission device (the wireless transmission device may be, for example, a relay station, a base station, or a wireless backhaul device such as a small-cell backhaul device), or the like.

It can be understood that functions of the function modules of the signal processing apparatus 400 in this embodiment may be specifically implemented according to the methods in the foregoing method embodiments. For a specific implementation process, reference may be made to related descriptions in the foregoing method embodiments, and details are not repeated herein. Some or all function modules of the signal processing apparatus 400 may be implemented by a hardware circuit, or some or all function modules of the signal processing apparatus 400 may be implemented by a processor (for example, a digital signal processor) by executing code or instructions.

It can be learned from above that after determining that there are N directions for received signals corresponding to a same signal source, the signal processing apparatus 400 in this embodiment of the present invention configures beam directions of an antenna as the N directions; estimates delays of the N received signals received by using the antenna, and separately performs, by using the estimated delays of the N received signals obtained after balance processing, delay compensation on the N received signals to obtain N received signals obtained after delay compensation, where the N received signals are in a one-to-one correspondence with the N directions; and performs combining processing on the N received signals obtained after delay compensation. Because N is an integer greater than 1, the N received signals corresponding to the N directions include multipath received signals corresponding to the same signal source. In addition, a problem about delays of the multipath received signals is considered in the foregoing solution. In this case, delay compensation is performed on N received signals obtained after balance processing, to obtain the N received signals obtained after delay compensation, and combining processing is performed on the N received signals obtained after delay compensation. The foregoing technical solution abandons a mechanism of eliminating multipath signals corresponding to a same signal source in a traditional technology, and makes full use of the multipath signals corresponding to the same signal source. It is found, by means of practices, that this manner helps increase a signal reception gain in a multipath scenario.

Referring to 5-a, an embodiment of the present invention further provides a signal processing apparatus 500. The signal processing apparatus 500 may include a controller 510, a delay estimation circuit 520, a delay compensation circuit 530, and a combiner 540.

The controller 510 is configured to: determine that there are N directions for received signals corresponding to a same signal source; and configure beam directions of an antenna as the N directions.

The delay estimation circuit 520 is configured to estimate delays of the N received signals received by using the antenna, where the N received signals are in a one-to-one correspondence with the N directions, and N is an integer greater than 1.

The delay compensation circuit 530 is configured to separately perform, by using the estimated delays of the N received signals, delay compensation on the N received signals obtained after balance processing to obtain N received signals obtained after delay compensation.

The combiner 540 is configured to perform combining processing on the N received signals obtained after delay compensation.

Optionally, in some possible implementations of the present invention, the controller 510 is specifically configured to: perform omnidirectional scanning by using the antenna, to determine that there are X1 directions for received signals corresponding to the same signal source; determine, as the N directions for the received signals corresponding to the same signal source, N directions in which received signal powers are higher among the X1 directions; and configure the beam directions of the antenna as the N directions, where X1 is an integer, and X1 is greater than or equal to N.

Optionally, in some possible implementations of the present invention, in the aspect of configuring beam directions of an antenna as the N directions, the controller 510 is specifically configured to:

configure beam directions of a multibeam antenna as the N directions; or configure beam directions of N single-beam antennas as the N directions, where the N single-beam antennas are in a one-to-one correspondence with the N directions.

Referring to FIG. 5-b, optionally, in some possible implementations of the present invention, the signal processing apparatus 500 further includes a balancer 550, configured to: before the delays of the N received signals received by using the antenna is estimated, perform balance processing on the N received signals received by using the antenna, to obtain N received signals obtained after balance processing.

The delay estimation circuit 520 is specifically configured to estimate delays of the N received signals obtained after balance processing.

The delay compensation circuit 530 is specifically configured to separately perform, by using the estimated delays of the N received signals obtained after balance processing, delay compensation on the N received signals obtained after balance processing to obtain the N received signals obtained after delay compensation.

Optionally, in some possible implementations of the present invention, the combiner 540 is specifically configured to: calculate a combining weight for the N received signals obtained after delay compensation; perform, by using the calculated combining weight for the N received signals obtained after delay compensation, weighted processing on the N received signals obtained after delay compensation, to obtain N received signals obtained after delay compensation and weighted processing; and combine the N received signals obtained after delay compensation and weighted processing.

Optionally, in some possible implementations of the present invention, in the aspect of calculating a combining weight for the N received signals obtained after delay compensation, the combiner 540 is specifically configured to: calculate, based on a minimum mean square error criterion, the combining weight for the N received signals obtained after delay compensation; or calculate, based on a least square criterion, the combining weight for the N received signals obtained after delay compensation; or calculate, based on a maximum signal to noise ratio criterion, the combining weight for the N received signals obtained after delay compensation.

Optionally, in some possible implementations of the present invention, the delay estimation circuit 520 is specifically configured to: calculate cross correlation values between a training sequence and signal sequences, entering a sliding window, of the N received signals obtained after balance processing, where a length of the sliding window is the same as a length of the training sequence; calculate delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculate, based on the calculated delay time points of the N received signals obtained after balance processing, the delays of the N received signals obtained after balance processing.

Optionally, in some possible implementations of the present invention, the delay estimation circuit 520 is specifically configured to: calculate cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence; calculate delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculate, based on the calculated delay time points of the N received signals obtained after balance processing, the delays of the N received signals obtained after balance processing.

Referring to FIG. 5-c, optionally, in some possible implementations of the present invention, the signal processing apparatus 500 further includes a balancer 550, configured to: before combining processing is performed on the N received signals obtained after delay compensation, perform balance processing on the N received signals obtained after delay compensation, to obtain N received signals obtained after balance processing.

The combiner 540 is specifically configured to perform combining processing on the N received signals obtained after balance processing.

Optionally, in some possible implementations of the present invention, the combiner 540 is specifically configured to: calculate a combining weight for the N received signals obtained after balance processing; perform, by using the calculated combining weight for the N received signals obtained after balance processing, weighted processing on the N received signals obtained after balance processing, to obtain N received signals obtained after balance processing and weighted processing; and combine the N received signals obtained after balance processing and weighted processing.

Optionally, in some possible implementations of the present invention, in the aspect of calculating a combining weight for the N received signals obtained after balance processing, the combiner 540 is specifically configured to: calculate, based on a minimum mean square error criterion, the combining weight for the N received signals obtained after balance processing; or calculate, based on a least square criterion, the combining weight for the N received signals obtained after balance processing; or calculate, based on a maximum signal to noise ratio criterion, the combining weight for the N received signals obtained after balance processing.

Optionally, in some possible implementations of the present invention, the delay estimation circuit 520 is specifically configured to: calculate cross correlation values between a training sequence and signal sequences, entering a sliding window, of the N received signals, where a length of the sliding window is the same as a length of the training sequence; calculate delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculate the delays of the N received signals based on the calculated delay time points of the N received signals.

Optionally, in some possible implementations of the present invention, the delay estimation circuit 520 is specifically configured to: calculate cross correlation values between a reference sequence and signal sequences, entering a sliding window, of the N received signals, where the reference sequence is an L-bit-long signal sequence of the $i^{th}$ received signal of the N received signals, and a width of the sliding window is the same as a width of the reference sequence; calculate delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculate the delays of the N received signals based on the calculated delay time points of the N received signals.

Optionally, in some possible implementations of the present invention, the controller 510 is further configured to: after combining processing is performed on the N received signals obtained after delay compensation, perform omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, change a beam direction configuration of the antenna to ensure that beam directions of the antenna that are obtained after the configuration is changed include the direction Xi, where the direction Xi is different from any direction of the N directions, and the direction Xj is any direction of the N directions.

Optionally, in some possible implementations of the present invention, the signal processing apparatus 500 may further include a demodulation processor 560, configured to perform demodulation processing on a combined signal obtained by performing combining processing on the N received signals obtained after delay compensation.

The signal processing apparatus 500 is a wireless transmission device, or may be deployed in a wireless transmission device (the wireless transmission device may be, for example, a relay station, a base station, or a wireless backhaul device such as a small-cell backhaul device), or the like.

It can be understood that functions of the modules of the signal processing apparatus 500 in this embodiment may be specifically implemented according to the methods in the foregoing method embodiments. For a specific implementation process, reference may be made to related descriptions in the foregoing method embodiments, and details are not repeated herein.

It can be learned from above that after determining that there are N directions for received signals corresponding to a same signal source, the signal processing apparatus 500 in this embodiment of the present invention configures beam directions of an antenna as the N directions; estimates delays of the N received signals received by using the antenna, and separately performs, by using the estimated delays of the N received signals obtained after balance processing, delay compensation on the N received signals to obtain N received signals obtained after delay compensation, where the N received signals are in a one-to-one correspondence with the N directions; and performs combining processing on the N received signals obtained after delay compensation. Because N is an integer greater than 1, the N received signals corresponding to the N directions include multipath received signals corresponding to the same signal source. In addition, a problem about delays of the multipath received signals is considered in the foregoing solution. In this case, delay compensation is performed on N received signals obtained after balance processing, to obtain the N received signals obtained after delay compensation, and combining processing is performed on the N received signals obtained after delay compensation. The foregoing technical solution abandons a mechanism of eliminating multipath signals corresponding to a same signal source in a traditional technology, and makes full use of the multipath signals corresponding to the same signal source. It is found, by means of practices, that this manner helps increase a signal reception gain in a multipath scenario.

Referring to FIG. 6, an embodiment of the present invention further provides a signal processing apparatus 600. The signal processing apparatus 600 may include:

a processor 610 and a memory 620, where the processor 610 is in a coupled connection to the memory 620 by using a bus 630, where the processor 610 may invoke code or instructions in the memory 620 to perform the following steps:

determining that there are N directions for received signals corresponding to a same signal source;

configuring beam directions of an antenna as the N directions;

estimating delays of the N received signals received by using the antenna, and separately performing, by using the estimated delays of the N received signals, delay compensation on the N received signals to obtain N received signals obtained after delay compensation, where the N received signals are in a one-to-one correspondence with the N directions, and N is an integer greater than 1; and performing combining processing on the N received signals obtained after delay compensation.

Optionally, in some possible implementations of the present invention, the determining that there are N directions for received signals corresponding to a same signal source includes: performing omnidirectional scanning by using the antenna, to determine that there are X1 directions for received signals corresponding to the same signal source; and determining, as the N directions for the received signals corresponding to the same signal source, N directions in which received signal powers are higher among the X1 directions, where X1 is an integer, and X1 is greater than or equal to N.

Optionally, in some possible implementations of the present invention, the configuring beam directions of an antenna as the N directions includes:

configuring beam directions of a multibeam antenna as the N directions; or configuring beam directions of N single-beam antennas as the N directions, where the N single-beam antennas are in a one-to-one correspondence with the N directions.

Optionally, in some possible implementations of the present invention, before the estimating delays of the N received signals received by using the antenna, the processor performs balance processing on the N received signals received by using the antenna, to obtain N received signals obtained after balance processing; and the estimating delays of the N received signals received by using the antenna, and separately performing, by using the estimated delays of the N received signals, delay compensation on the N received signals to obtain N received signals obtained after delay compensation includes:

estimating delays of the N received signals obtained after balance processing, and separately performing, by using the estimated delays of the N received signals obtained after balance processing, delay compensation on the N received signals obtained after balance processing to obtain the N received signals obtained after delay compensation.

Optionally, in some possible implementations of the present invention, the performing combining processing on the N received signals obtained after delay compensation includes:

calculating a combining weight for the N received signals obtained after delay compensation; performing, by using the calculated combining weight for the N received signals obtained after delay compensation, weighted processing on the N received signals obtained after delay compensation, to obtain N received signals obtained after delay compensation and weighted processing; and combining the N received signals obtained after delay compensation and weighted processing.

Optionally, in some possible implementations of the present invention, the calculating a combining weight for the N received signals obtained after delay compensation includes: calculating, based on a minimum mean square error criterion, the combining weight for the N received signals obtained after delay compensation; or calculating, based on a least square criterion, the combining weight for the N received signals obtained after delay compensation; or calculating, based on a maximum signal to noise ratio criterion, the combining weight for the N received signals obtained after delay compensation.

Optionally, in some possible implementations of the present invention, the estimating delays of the N received signals obtained after balance processing includes:

calculating cross correlation values between a training sequence and signal sequences, entering a sliding window, of the N received signals obtained after balance processing, where a length of the sliding window is the same as a length of the training sequence;

calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

Optionally, in some possible implementations of the present invention, the estimating delays of the N received signals obtained after balance processing includes:

calculating cross correlation values between a reference sequence and signal sequences, entering a sliding window, of the N received signals obtained after balance processing, where the reference sequence is an L-bit-long signal sequence of the $i^{th}$ received signal of the N received signals obtained after balance processing, and a width of the sliding window is the same as a width of the reference sequence;

calculating delay time points of the N received signals obtained after balance processing, where a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, where a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

Optionally, in some possible implementations of the present invention, before the performing combining processing on the N received signals obtained after delay compensation, the processor performs balance processing on the N received signals obtained after delay compensation, to obtain N received signals obtained after balance processing; and the performing combining processing on the N received signals obtained after delay compensation includes: performing combining processing on the N received signals obtained after balance processing.

Optionally, in some possible implementations of the present invention, the performing combining processing on the N received signals obtained after balance processing includes:

calculating a combining weight for the N received signals obtained after balance processing; performing, by using the calculated combining weight for the N received signals obtained after balance processing, weighted processing on the N received signals obtained after balance processing, to obtain N received signals obtained after balance processing and weighted processing; and combining the N received signals obtained after balance processing and weighted processing.

Optionally, in some possible implementations of the present invention, the calculating a combining weight for the N received signals obtained after balance processing includes: calculating, based on a minimum mean square error criterion, the combining weight for the N received signals obtained after balance processing; or calculating, based on a least square criterion, the combining weight for the N received signals obtained after balance processing; or calculating, based on a maximum signal to noise ratio criterion, the combining weight for the N received signals obtained after balance processing.

Optionally, in some possible implementations of the present invention, the estimating delays of the N received signals includes: calculating cross correlation values between a training sequence and signal sequences, entering a sliding window, of the N received signals, where a length of the sliding window is the same as a length of the training sequence; and calculating delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculating the delays of the N received signals based on the calculated delay time points of the N received signals.

Optionally, in some possible implementations of the present invention, the estimating delays of the N received signals includes: calculating cross correlation values between a reference sequence and signal sequences, entering a sliding window, of the N received signals, where the reference sequence is an L-bit-long signal sequence of the $i^{th}$ received signal of the N received signals, and a width of the sliding window is the same as a width of the reference sequence; and calculating delay time points of the N received signals, where a delay time point Ti of the $i^{th}$ received signal is a receiving time point of a signal sequence of all signal sequences, entering the sliding window, of the $i^{th}$ received signal that is within a training sequence insertion period, where a cross correlation value between the signal sequence and the training sequence is the greatest, and the $i^{th}$ received signal is any one of the N received signals; and calculating the delays of the N received signals based on the calculated delay time points of the N received signals.

Optionally, in some possible implementations of the present invention, after the performing combining processing on the N received signals obtained after delay compensation, the processor further performs omnidirectional scanning by using the antenna, to determine that there are X2 directions for received signals corresponding to the same signal source; and when a received signal power of a received signal in a direction Xi of the X2 directions is higher than a received signal power of a received signal in a direction Xj, changes a beam direction configuration of the antenna to ensure that beam directions of the antenna that are obtained after the configuration is changed include the direction Xi, where the direction Xi is different from any direction of the N directions, and the direction Xj is any direction of the N directions.

The signal processing apparatus 600 is a wireless transmission device, or may be deployed in a wireless transmission device (the wireless transmission device may be, for example, a relay station, a base station, or a wireless backhaul device such as a small-cell backhaul device), or the like.

It can be understood that functions of the modules of the signal processing apparatus 600 in this embodiment may be specifically implemented according to the methods in the foregoing method embodiments. For a specific implementation process, reference may be made to related descriptions in the foregoing method embodiments, and details are not repeated herein.

It can be learned from above that after determining that there are N directions for received signals corresponding to a same signal source, the signal processing apparatus 600 in this embodiment of the present invention configures beam directions of an antenna as the N directions; estimates delays of the N received signals received by using the antenna, and separately performs, by using the estimated delays of the N received signals obtained after balance processing, delay compensation on the N received signals to obtain N received signals obtained after delay compensation, where the N received signals are in a one-to-one correspondence with the N directions; and performs combining processing on the N received signals obtained after delay compensation. Because N is an integer greater than 1, the N received signals corresponding to the N directions include multipath received signals corresponding to the same signal source. In addition, a problem about delays of the multipath received signals is considered in the foregoing solution. In this case, delay compensation is performed on N received signals obtained after balance processing, to obtain the N received signals obtained after delay compensation, and combining processing is performed on the N received signals obtained after delay compensation. The foregoing technical solution abandons a mechanism of eliminating multipath signals corresponding to a same signal source in a traditional technology, and makes full use of the multipath signals corresponding to the same signal source. It is found, by means of practices, that this manner helps increase a signal reception gain in a multipath scenario.

Figure 7:
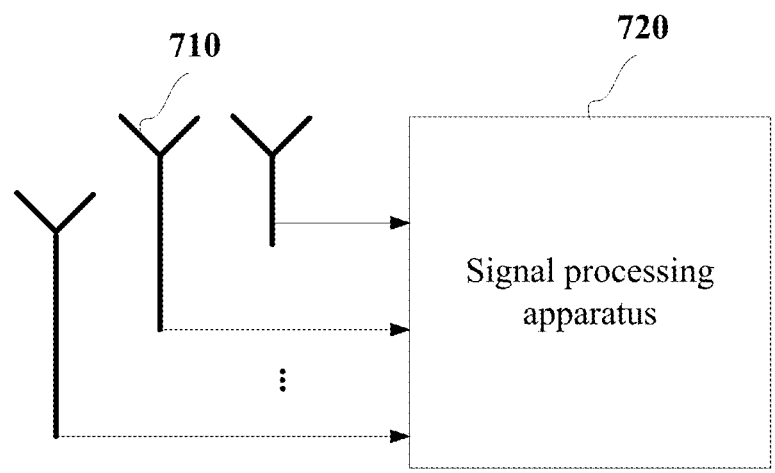
FIG. 7 is a schematic diagram of another wireless transmission device according to an embodiment of the present invention.

Referring to FIG. 7, an embodiment of the present invention further provides a wireless transmission device. The wireless transmission device may include an antenna 710 and a signal processing apparatus 720. The signal processing apparatus 720 may be any signal processing apparatus in the foregoing embodiments.

An embodiment of the present invention further provides a computer storage medium. The computer storage medium may store a program, and when the program is executed, some or all steps of any signal processing method recorded in the foregoing method embodiments may be included.

In the foregoing embodiments, the description of each embodiment has respective focuses. For a part that is not described in detail in an embodiment, reference may be made to related descriptions in other embodiments.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are examples of embodiments, and the related actions and modules are not necessarily mandatory to the present invention.

In the several embodiments provided in the present application, it should be understood that the disclosed apparatus may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like, and may specifically be a processor in a computer device) to perform all or a part of the steps of the foregoing methods described in the embodiments of the present invention. The foregoing storage medium may include any medium that can store program code, such as a USB flash drive, a removable hard disk, a magnetic disk, an optical disc, a read-only memory (ROM, Read-Only Memory), or a random access memory (RAM, Random Access Memory).

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A signal processing method, comprising:
   determining N directions for received signals corresponding to a same signal source;
   configuring beam directions of an antenna as the N directions;
   performing balance processing on N received signals received by the antenna, to obtain N received signals obtained after balance processing;
   estimating delays of the N received signals received by the antenna, and separately performing, by using the estimated delays of the N received signals, delay compensation on the N received signals to obtain N received signals obtained after delay compensation, comprising:
      estimating delays of the N received signals obtained after balance processing, and separately performing, by using the estimated delays of the N received signals obtained after balance processing, delay compensation on the N received signals obtained after balance processing to obtain the N received signals obtained after delay compensation, wherein the N received signals are in a one-to-one correspondence with the N directions, and N is an integer greater than 1;
   performing combining processing on the N received signals obtained after delay compensation.

2. The method according to claim 1, wherein performing combining processing on the N received signals obtained after delay compensation comprises:
   calculating a combining weight for the N received signals obtained after delay compensation;
   performing, by using the calculated combining weight for the N received signals obtained after delay compensation, weighted processing on the N received signals obtained after delay compensation, to obtain N received signals obtained after delay compensation and weighted processing; and
   combining the N received signals obtained after delay compensation and weighted processing.

3. The method according to claim 2, wherein calculating a combining weight for the N received signals obtained after delay compensation comprises:
   calculating, based on a minimum mean square error criterion, the combining weight for the N received signals obtained after delay compensation; or
   calculating, based on a least square criterion, the combining weight for the N received signals obtained after delay compensation; or
   calculating, based on a maximum signal to noise ratio criterion, the combining weight for the N received signals obtained after delay compensation.

4. The method according to claim 1, wherein estimating delays of the N received signals obtained after balance processing comprises:
   calculating cross correlation values between a training sequence and signal sequences, entering a sliding window, of the N received signals obtained after balance processing, wherein a length of the sliding window is the same as a length of the training sequence;
   calculating delay time points of the N received signals obtained after balance processing, wherein a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, wherein a cross correlation value between the signal sequence and the training sequence is the greatest, and the $i^{th}$ received signal obtained after balance processing is any one of the N received signals obtained after balance processing; and calculating, based on the calculated delay time points of the N received signals obtained after balance processing, the delays of the N received signals obtained after balance processing.

5. The method according to claim 1, wherein estimating delays of the N received signals obtained after balance processing comprises:
    calculating cross correlation values between a reference sequence and signal sequences, entering a sliding window, of the N received signals obtained after balance processing, wherein the reference sequence is an L-bit-long signal sequence of the $i^{th}$ received signal of the N received signals obtained after balance processing, and a width of the sliding window is the same as a width of the reference sequence;
    calculating delay time points of the N received signals obtained after balance processing, wherein a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, wherein a cross correlation value between the signal sequence and the training sequence is the greatest, and the $i^{th}$ received signal obtained after balance processing is any one of the N received signals obtained after balance processing; and
    calculating, based on the calculated delay time points of the N received signals obtained after balance processing, the delays of the N received signals obtained after balance processing.

6. A signal processing method, comprising:
    determining N directions for received signals corresponding to a same signal source;
    configuring beam directions of an antenna as the N directions;
    estimating delays of N received signals received by the antenna, and separately performing, by using the estimated delays of the N received signals, delay compensation on the N received signals to obtain N received signals obtained after delay compensation, wherein the N received signals are in a one-to-one correspondence with the N directions, and N is an integer greater than 1;
    performing balance processing on the N received signals obtained after delay compensation, to obtain N received signals obtained after balance processing; and
    performing combining processing on the N received signals obtained after balance processing.

7. The method according to claim 6, wherein performing combining processing on the N received signals obtained after balance processing comprises:
    calculating a combining weight for the N received signals obtained after balance processing;
    performing, by using the calculated combining weight for the N received signals obtained after balance processing, weighted processing on the N received signals obtained after balance processing, to obtain N received signals obtained after balance processing and weighted processing; and
    combining the N received signals obtained after balance processing and weighted processing.

8. The method according to claim 6, wherein estimating delays of the N received signals comprises:
    calculating cross correlation values between a training sequence and signal sequences, entering a sliding window, of the N received signals, wherein a length of the sliding window is the same as a length of the training sequence; and
    calculating delay time points of the N received signals, wherein a delay time point Ti of the $i^{th}$ received signal is a receiving time point of a signal sequence of all signal sequences, entering the sliding window, of the $i^{th}$ received signal that is within a training sequence insertion period, wherein a cross correlation value between the signal sequence and the training sequence is the greatest, and the $i^{th}$ received signal is any one of the N received signals; and calculating the delays of the N received signals based on the calculated delay time points of the N received signals.

9. The method according to claim 6, wherein estimating delays of the N received signals comprises:
    calculating cross correlation values between a reference sequence and signal sequences, entering a sliding window, of the N received signals, wherein the reference sequence is an L-bit-long signal sequence of the $i^{th}$ received signal of the N received signals, and a width of the sliding window is the same as a width of the reference sequence; and
    calculating delay time points of the N received signals, wherein a delay time point Ti of the $i^{th}$ received signal is a receiving time point of a signal sequence of all signal sequences, entering the sliding window, of the $i^{th}$ received signal that is within a training sequence insertion period, wherein a cross correlation value between the signal sequence and the training sequence is the greatest, and the $i^{th}$ received signal is any one of the N received signals; and calculating the delays of the N received signals based on the calculated delay time points of the N received signals.

10. A signal processing apparatus, comprising:
    a controller, configured to:
        determine that there are N directions for received signals corresponding to a same signal source; and
        configure beam directions of an antenna as the N directions;
    a balancer, configured to perform balance processing on N received signals received by the antenna, to obtain N received signals obtained after balance processing;
    a delay estimation circuit, configured to estimate delays of the N received signals received by the antenna, wherein the delay estimation circuit is configured to estimate delays of the N received signals obtained after balance processing; wherein the N received signals are in a one-to-one correspondence with the N directions, and N is an integer greater than 1;
    a delay compensation circuit, configured to separately perform, by using the estimated delays of the N received signals obtained after balance processing, delay compensation on the N received signals obtained after balance processing to obtain N received signals obtained after delay compensation; and
    a combiner, configured to perform combining processing on the N received signals obtained after delay compensation.

11. The signal processing apparatus according to claim 10, wherein the combiner is configured to:
    calculate a combining weight for the N received signals obtained after delay compensation;
    perform, by using the calculated combining weight for the N received signals obtained after delay compensation, weighted processing on the N received signals obtained after delay compensation, to obtain N received signals obtained after delay compensation and weighted processing; and combine the N received signals obtained after delay compensation and weighted processing.

12. The signal processing apparatus according to claim 11, wherein to calculate a combining weight for the N received signals obtained after delay compensation, the combiner is configured to:

calculate, based on a minimum mean square error criterion, the combining weight for the N received signals obtained after delay compensation; or calculate, based on a least square criterion, the combining weight for the N received signals obtained after delay compensation; or calculate, based on a maximum signal to noise ratio criterion, the combining weight for the N received signals obtained after delay compensation.

13. The signal processing apparatus according to claim 10, wherein the delay estimation circuit is configured to:

calculate cross correlation values between a training sequence and signal sequences, entering a sliding window, of the N received signals obtained after balance processing, wherein a length of the sliding window is the same as a length of the training sequence;

calculate delay time points of the N received signals obtained after balance processing, wherein a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, wherein a cross correlation value between the signal sequence and the training sequence is the greatest, and the $i^{th}$ received signal obtained after balance processing is any one of the N received signals obtained after balance processing; and calculate, based on the calculated delay time points of the N received signals obtained after balance processing, the delays of the N received signals obtained after balance processing.

14. The signal processing apparatus according to claim 10, wherein the delay estimation circuit is configured to:

calculate cross correlation values between a reference sequence and signal sequences, entering a sliding window, of the N received signals obtained after balance processing, wherein the reference sequence is an L-bit-long signal sequence of the $i^{th}$ received signal of the N received signals obtained after balance processing, and a width of the sliding window is the same as a width of the reference sequence;

calculate delay time points of the N received signals obtained after balance processing, wherein a delay time point Ti of the $i^{th}$ received signal obtained after balance processing is a receiving time point of a signal sequence of all signal sequences, entering the sliding window, of the $i^{th}$ received signal obtained after balance processing within a training sequence insertion period, wherein a cross correlation value between the signal sequence and the training sequence is the greatest, and the $i^{th}$ received signal obtained after balance processing is any one of the N received signals obtained after balance processing; and calculate, based on the calculated delay time points of the N received signals obtained after balance processing, the delays of the N received signals obtained after balance processing.

15. A signal processing apparatus, comprising:

a controller, configured to:
determine that there are N directions for received signals corresponding to a same signal source; and
configure beam directions of an antenna as the N directions;

a delay estimation circuit, configured to estimate delays of N received signals received by the antenna, wherein the N received signals are in a one-to-one correspondence with the N directions, and N is an integer greater than 1;

a delay compensation circuit, configured to separately perform, by using the estimated delays of the N received signals, delay compensation on N received signals obtained after balance processing to obtain N received signals obtained after delay compensation;

a combiner, configured to perform combining processing on the N received signals obtained after delay compensation;

a balancer, configured to:
before combining processing is performed on the N received signals obtained after delay compensation, perform balance processing on the N received signals obtained after delay compensation, to obtain N received signals obtained after balance processing; and the combiner is configured to:
perform combining processing on the N received signals obtained after balance processing.

16. The signal processing apparatus according to claim 15, wherein the combiner is configured to:

calculate a combining weight for the N received signals obtained after balance processing;

perform, by using the calculated combining weight for the N received signals obtained after balance processing, weighted processing on the N received signals obtained after balance processing, to obtain N received signals obtained after balance processing and weighted processing; and combine the N received signals obtained after balance processing and weighted processing.

17. The signal processing apparatus according to claim 15, wherein the delay estimation circuit is configured to:

calculate cross correlation values between a training sequence and signal sequences, entering a sliding window, of the N received signals, wherein a length of the sliding window is the same as a length of the training sequence;

calculate delay time points of the N received signals, wherein a delay time point Ti of the $i^{th}$ received signal is a receiving time point of a signal sequence of all signal sequences, entering the sliding window, of the $i^{th}$ received signal that is within a training sequence insertion period, wherein a cross correlation value between the signal sequence and the training sequence is the greatest, and the $i^{th}$ received signal is any one of the N received signals; and calculate the delays of the N received signals based on the calculated delay time points of the N received signals.

18. The signal processing apparatus according to claim 15, wherein the delay estimation circuit is configured to:

calculate cross correlation values between a reference sequence and signal sequences, entering a sliding window, of the N received signals, wherein the reference sequence is an L-bit-long signal sequence of the $i^{th}$ received signal of the N received signals, and a width of the sliding window is the same as a width of the reference sequence;

calculate delay time points of the N received signals, wherein a delay time point Ti of the $i^{th}$ received signal is a receiving time point of a signal sequence of all signal sequences, entering the sliding window, of the $i^{th}$ received signal that is within a training sequence insertion period, wherein a cross correlation value between the signal sequence and the training sequence is the greatest, and the $i^{th}$ received signal is any one of the N received signals; and calculate the delays of the N received signals based on the calculated delay time points of the N received signals.

* * * * *